US012639854B2

(12) United States Patent
Zhang

(10) Patent No.: US 12,639,854 B2
(45) Date of Patent: May 26, 2026

(54) SYSTEMS, METHODS, AND MEDIA FOR CALIBRATING STRUCTURED LIGHT CAMERA SYSTEMS

(71) Applicant: PURDUE RESEARCH FOUNDATION, West Lafayette, IN (US)

(72) Inventor: Song Zhang, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 207 days.

(21) Appl. No.: 18/654,872

(22) Filed: May 3, 2024

(65) Prior Publication Data

US 2024/0371038 A1 Nov. 7, 2024

Related U.S. Application Data

(60) Provisional application No. 63/500,077, filed on May 4, 2023.

(51) Int. Cl.
*G06T 7/80* (2017.01)
*G06F 3/147* (2006.01)

(52) U.S. Cl.
CPC ................ *G06T 7/80* (2017.01); *G06F 3/147* (2013.01)

(58) Field of Classification Search
CPC ............. G06T 7/80; G06T 2207/10012; G06T 2207/30121; G06T 7/85; G06F 3/147
See application file for complete search history.

(56) References Cited

U.S. PATENT DOCUMENTS

2018/0376116 A1* 12/2018 Grundhöfer ......... H04N 9/3185

OTHER PUBLICATIONS

Asundi et al., "Unified calibration technique and its applications in optical triangular profilometry," Appl. Opt. 38, 3556-3561 (1999).
Cui et al., "A generalized reference-plane-based calibration method in optical triangular profilometry," Opt. Express 17, 20735-20746 (2009).
Fujigaki et al., "Development of a compact 3d shape measurement unit using the light-source-stepping method," Opt. Lasers Eng. 85, 9-17 (2016).

(Continued)

*Primary Examiner* — Thanh Luu
*Assistant Examiner* — Mai Thi Ngoc Tran
(74) *Attorney, Agent, or Firm* — Quarles & Brady, LLP

(57) ABSTRACT

Systems, methods and media for calibrating structured light camera systems are provided. In some examples, a system comprises: a light source; a first camera comprising: a first image sensor; and a first lens; a second camera comprising: a second image sensor; and a second lens; and a processor programmed to: receive, from the first and second image sensors, first images of a predetermined first pattern presented on a flat panel display; calibrate the first and second cameras using the first images and features of the predetermined first pattern; cause the light source to emit a series of second patterns toward a scene including a flat surface; receive, from image sensors, second images of the series of second patterns; and calibrate the light source using the second images and features of the series of second patterns.

20 Claims, 18 Drawing Sheets

400

(56) References Cited

OTHER PUBLICATIONS

Guo et al., "Least-squares calibration method for fringe projection profilometry," Opt. Eng. (2005).

Huang et al., "A new reconstruction method based on fringe projection of three-dimensional measuring system," Opt. Lasers Eng. 52, 115-122 (2014).

Li et al., "Accurate phase-height mapping algorithm for pmp," J. Mod. Opt. 53, 1955-1964 (2006).

Liu et al., "Calibration of fringe projection profilometry using an inaccurate 2d reference target," Optics and Lasers in Engineering 89, 131-137 (2017).

Luo et al., "A simple calibration procedure for structured light system," Opt. Lasers Eng. 57, 6-12 (2014).

Lv et al., "Projector distortion correction in 3D shape measurement using a structured-light system by deep neural networks," Opt. Lett. 45, 204-207 (2020).

Marrugo et al., "Method for large-scale structured-light system calibration," Optics Express 29, 17316-17329 (2021).

Marrugo et al., "State-of-the-art active optical techniques for three-dimensional surface metrology: a review," J. Opt. Soc. Am. A 37, B60-B77 (2020).

Su et al., "Phase-height mapping and coordinate calibration simultaneously in phase-measuring profilometry," Opt. Eng. 43, 708-712 (2004).

Vargas et al., "Hybrid calibration procedure for fringe projection profilometry based on stereo vision and polynomial fitting," Applied Optics 59, D163-7 (2020).

Vargas R. et al., "Calibration method based on virtual phase-to-coordinate mapping with linear correction function for structured light system," Optics and Lasers in Engineering, 183, 108496, (2024).

Vo et al., "Flexible calibration technique for fringe-projection-based threedimensional imaging," Opt. Lett. 35, 3192-3194 (2010).

Wen et al., "Universal calculation formula and calibration method in fourier transform profilometry," Appl. Opt. 49, 6563-6569 (2010).

Xiao et al., "Improved algorithm for phase-to-height mapping in phase measuring profilometry," Appl. Opt. 51, 1149-1155 (2012).

Xu et al., "A simple calibration method for structured light-based 3d profile measurement," Opt. Laser Technol. 48, 187-193 (2013).

Xu et al., "Status, challenges, and future perspectives of fringe projection profilometry," Opt. Laser Eng. 135, 106193 (2020).

Yang et al., "Projector distortion residual compensation in fringe projection system," Opt. Lasers Eng. 114, 104-110 (2019).

Yang Y. et al., "Calibration of dual resolution dual camera structured light systems," Optics and Lasers in Engineering, 182, 108472, (2024).

Yang Y. et al., "Pixelwise calibration method for telecentric structured light system," Applied Optics, 63(10), 2562-2569 (2024).

Yang, Y. et al., "Unidirectional structured light system calibration with auxiliary camera and projector," Optics and Lasers in Engineering, 175, 107984, (2024).

Zhang et al., "Novel method for structured light system calibration," Optical Engineering 45, 083601 (2006).

Zhang, "A flexible new technique for camera calibration," IEEE Trans. Pattern Anal. Mach. Intell. 22, 1330-1334 (2000).

Zhang, "Absolute phase retrieval methods for digital fringe projection profilometry: a review," Opt. Laser Eng. 107, 28-37 (2018).

Zhang, "Flexible and high-accuracy method for uni-directional structured light system calibration," Optics and Lasers in Engineering 143, 106637 (2021).

Zhang, "High-speed 3d shape measurement with structured light methods: a review," Opt. Laser Eng. 106, 119-131 (2018).

Zhang, "Pixel-wise structured light calibration method with a color calibration target," Opt. Express 30, 35817-35827 (2022).

Zhao et al., "Discussion on accurate phase-height mapping in fringe projection profilometry," Opt. Eng. 56, 1-11-11 (2017).

Zhao et al., "Whole-field high precision point to point calibration method," Opt. Lasers Eng. 111, 71-79 (2018).

Zhou et al., "A direct mapping algorithm for phase-measuring profilometry," J. Mod. Opt. (1994).

* cited by examiner

500

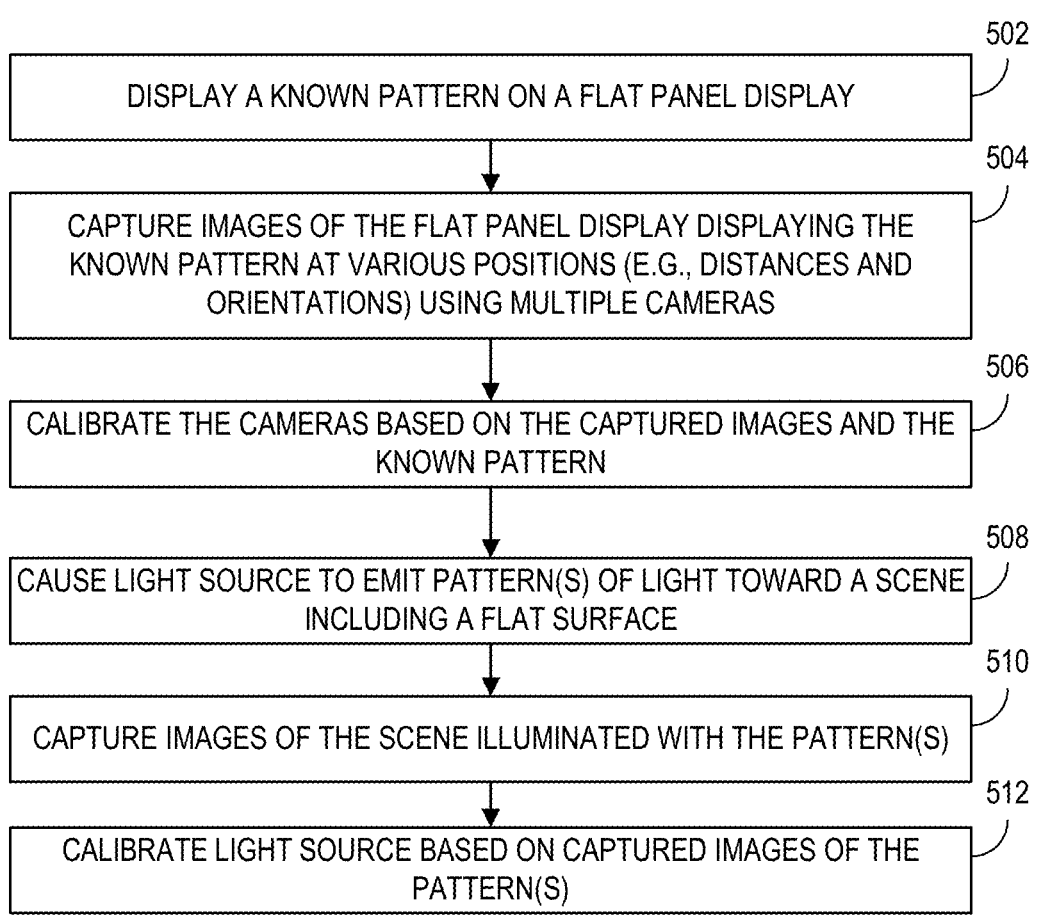

DISPLAY A KNOWN PATTERN ON A FLAT PANEL DISPLAY — 502

CAPTURE IMAGES OF THE FLAT PANEL DISPLAY DISPLAYING THE KNOWN PATTERN AT VARIOUS POSITIONS (E.G., DISTANCES AND ORIENTATIONS) USING MULTIPLE CAMERAS — 504

CALIBRATE THE CAMERAS BASED ON THE CAPTURED IMAGES AND THE KNOWN PATTERN — 506

CAUSE LIGHT SOURCE TO EMIT PATTERN(S) OF LIGHT TOWARD A SCENE INCLUDING A FLAT SURFACE — 508

CAPTURE IMAGES OF THE SCENE ILLUMINATED WITH THE PATTERN(S) — 510

CALIBRATE LIGHT SOURCE BASED ON CAPTURED IMAGES OF THE PATTERN(S) — 512

FIG. 5

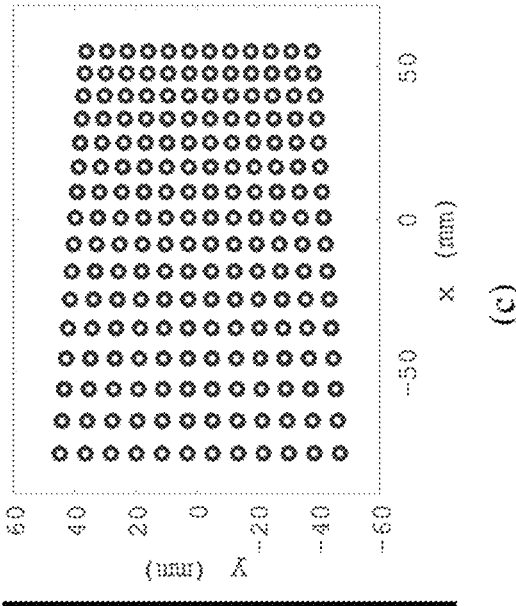
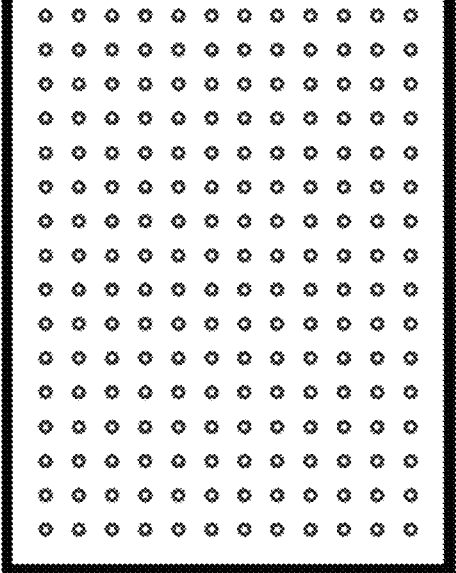
FIG. 7

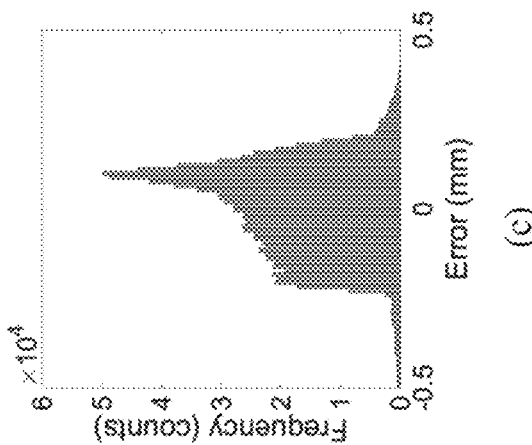
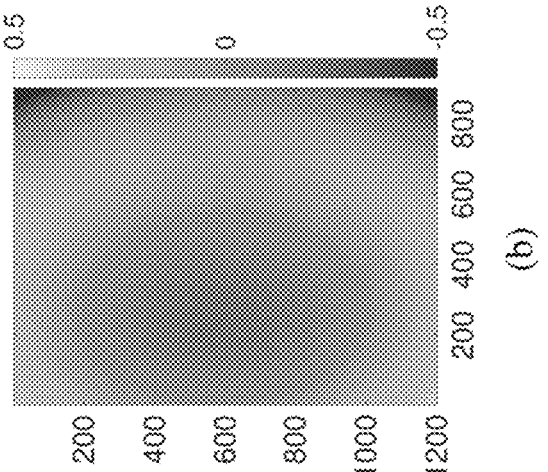
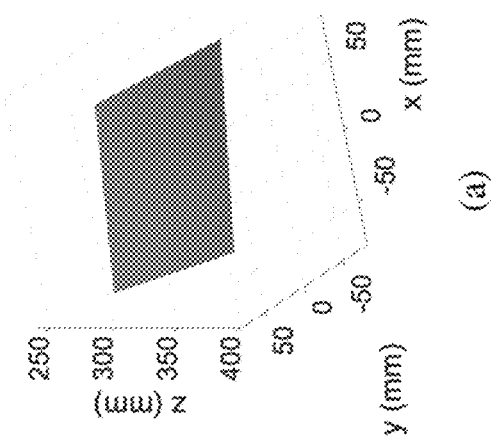
FIG. 8

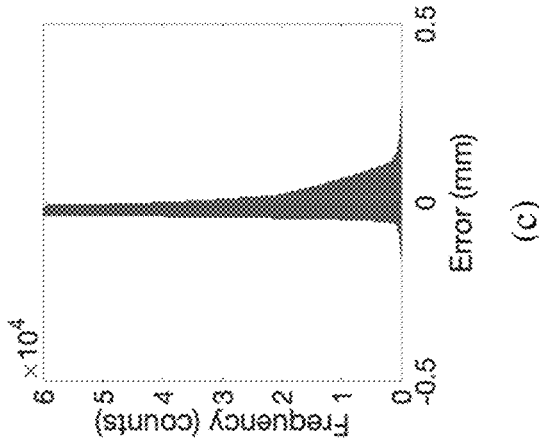
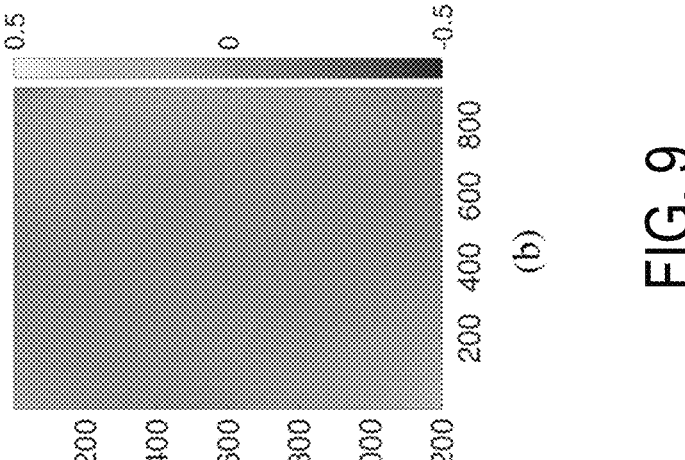
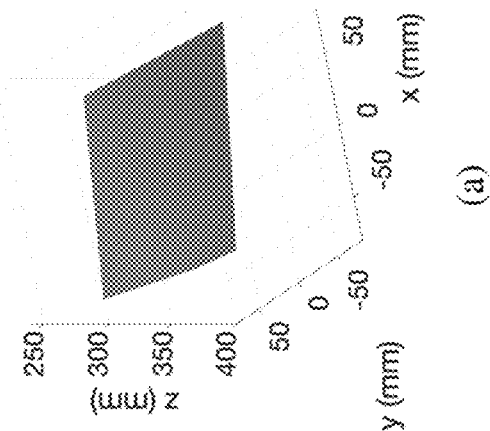
FIG. 9

Table 1. Testing planes and the corresponding measurement rmse $\sigma$ (mm) before considering projector lens distortions..

| Plane x, y, z range | | | | | | Fitted plane constants | | | rmse |
|---|---|---|---|---|---|---|---|---|---|
| $x_{min}$ | $x_{max}$ | $y_{min}$ | $y_{max}$ | $z_{min}$ | $z_{max}$ | a | b | c | $\sigma$ |
| -64.33 | 69.47 | -55.82 | 53.63 | 245.49 | 293.82 | 0.36 | -0.01, | 268.69 | 0.14 |
| -72.76 | 78.70 | -63.26 | 60.03 | 276.06 | 332.87 | 0.36 | -0.04, | 302.92 | 0.13 |
| -80.19 | 86.81 | -69.78 | 65.41 | 301.20 | 367.16 | 0.36 | -0.07, | 332.20 | 0.14 |
| -84.45 | 91.44 | -73.50 | 68.37 | 315.10 | 386.76 | 0.35 | -0.09, | 348.66 | 0.15 |
| -101.71 | 77.20 | -73.87 | 69.15 | 318.83 | 389.72 | -0.35 | -0.08, | 349.13 | 0.16 |
| -95.09 | 72.14 | -69.24 | 63.83 | 295.02 | 364.35 | -0.35 | -0.11, | 324.32 | 0.14 |
| -87.81 | 66.63 | -63.94 | 58.52 | 271.06 | 336.45 | -0.35 | -0.13, | 298.44 | 0.13 |
| -79.79 | 60.68 | -58.10 | 53.75 | 249.36 | 305.73 | -0.34 | -0.10, | 272.83 | 0.15 |
| -68.98 | 66.48 | -52.90 | 51.32 | 261.77 | 281.19 | 0.12 | 0.02, | 271.23 | 0.14 |
| -78.61 | 75.72 | -60.86 | 58.35 | 300.28 | 320.27 | 0.12 | -0.01, | 310.48 | 0.14 |
| -84.19 | 81.08 | -65.18 | 62.33 | 321.08 | 342.95 | 0.12 | -0.02, | 332.20 | 0.15 |
| -89.92 | 86.63 | -69.24 | 66.88 | 342.63 | 366.40 | 0.12 | 0.01, | 354.73 | 0.17 |
| -94.96 | 91.36 | -73.44 | 69.56 | 359.26 | 386.41 | 0.12 | -0.04, | 372.91 | 0.19 |
| -91.25 | 88.54 | -71.18 | 59.72 | 308.14 | 374.51 | 0.13 | -0.36, | 338.08 | 0.15 |
| -82.05 | 79.55 | -63.95 | 54.44 | 280.80 | 336.48 | 0.13 | -0.32, | 306.01 | 0.13 |
| -75.64 | 73.31 | -58.93 | 50.60 | 260.96 | 310.07 | 0.13 | -0.30, | 283.16 | 0.14 |
| -68.76 | 66.59 | -53.52 | 46.83 | 241.62 | 281.63 | 0.13 | -0.25, | 259.66 | 0.17 |
| -74.49 | 72.62 | -51.60 | 56.06 | 254.42 | 307.15 | 0.14 | 0.31, | 278.88 | 0.11 |
| -88.77 | 86.48 | -61.50 | 66.76 | 303.34 | 365.76 | 0.14 | 0.31, | 332.60 | 0.13 |

FIG. 10

Table 2. Testing planes and the corresponding measurement rmse $\sigma$ (mm) after considering projector lens distortions.

| Plane x, y, z range | | | | | | Fitted plane constants | | | rmse |
|---|---|---|---|---|---|---|---|---|---|
| $x_{min}$ | $x_{max}$ | $y_{min}$ | $y_{max}$ | $z_{min}$ | $z_{max}$ | a | b | c | $\sigma$ |
| -64.92 | 68.39 | -56.17 | 53.09 | 244.80 | 293.62 | 0.36 | -0.01 | 268.55 | 0.028 |
| -73.59 | 77.51 | -63.67 | 59.48 | 274.75 | 332.82 | 0.36 | -0.04 | 302.75 | 0.039 |
| -81.12 | 85.51 | -70.23 | 64.84 | 299.81 | 367.14 | 0.36 | -0.07 | 331.97 | 0.044 |
| -85.42 | 90.08 | -73.99 | 67.79 | 313.73 | 386.78 | 0.36 | -0.09 | 348.39 | 0.047 |
| -102.89 | 76.02 | -74.30 | 68.41 | 317.96 | 389.02 | -0.35 | -0.08 | 348.00 | 0.029 |
| -96.18 | 71.04 | -69.56 | 63.13 | 294.06 | 363.63 | -0.34 | -0.11 | 323.28 | 0.028 |
| -88.80 | 65.61 | -64.22 | 57.85 | 269.95 | 335.72 | -0.34 | -0.13 | 297.49 | 0.028 |
| -80.67 | 59.75 | -58.35 | 53.12 | 248.09 | 305.02 | -0.34 | -0.10 | 271.98 | 0.026 |
| -69.50 | 65.26 | -53.23 | 50.79 | 261.21 | 280.18 | 0.13 | 0.01 | 270.88 | 0.030 |
| -79.50 | 74.57 | -61.25 | 57.80 | 299.27 | 320.19 | 0.13 | -0.01 | 310.05 | 0.042 |
| -85.15 | 79.86 | -65.60 | 61.76 | 319.88 | 342.89 | 0.13 | -0.02 | 331.72 | 0.035 |
| -90.76 | 85.18 | -69.69 | 66.29 | 342.03 | 365.73 | 0.13 | 0.01 | 354.21 | 0.038 |
| -96.08 | 89.99 | -73.92 | 68.97 | 357.90 | 386.40 | 0.12 | -0.04 | 372.31 | 0.046 |
| -92.30 | 87.22 | -71.64 | 59.16 | 306.74 | 374.49 | 0.13 | -0.36 | 337.45 | 0.042 |
| -82.98 | 78.35 | -64.36 | 53.89 | 279.34 | 336.41 | 0.13 | -0.32 | 305.47 | 0.038 |
| -76.49 | 72.20 | -59.30 | 50.06 | 259.42 | 309.98 | 0.13 | -0.30 | 282.66 | 0.033 |
| -69.53 | 65.57 | -53.86 | 46.29 | 240.02 | 281.54 | 0.13 | -0.26 | 259.22 | 0.031 |
| -75.11 | 71.34 | -51.93 | 55.52 | 253.89 | 306.30 | 0.14 | 0.31 | 278.65 | 0.022 |
| -89.60 | 85.04 | -61.89 | 66.18 | 302.76 | 365.12 | 0.14 | 0.31 | 332.27 | 0.028 |

FIG. 11

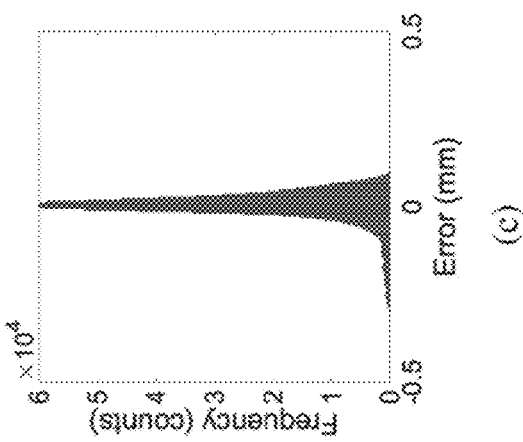
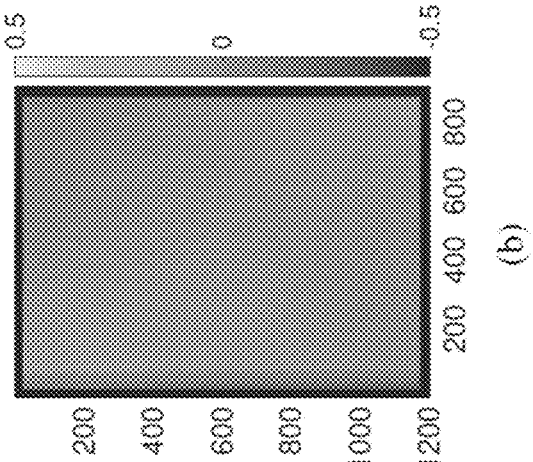
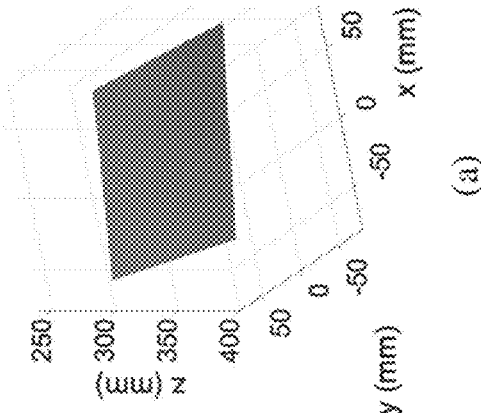
FIG. 12

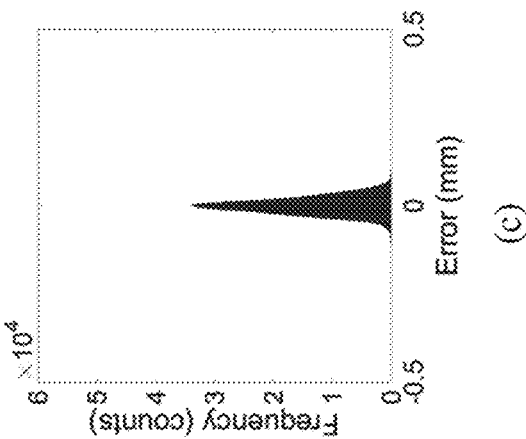
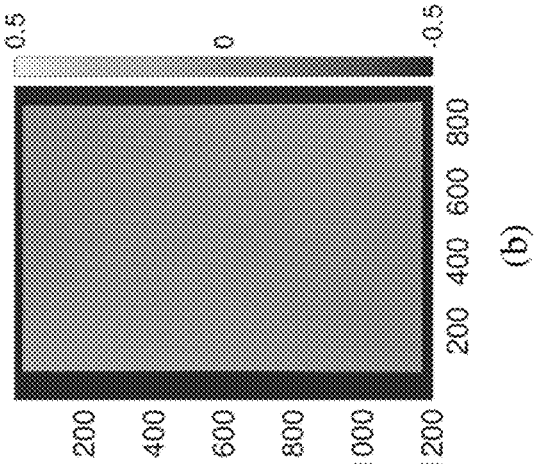
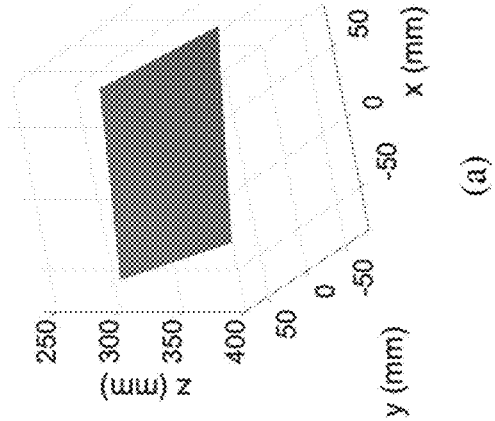
FIG. 14

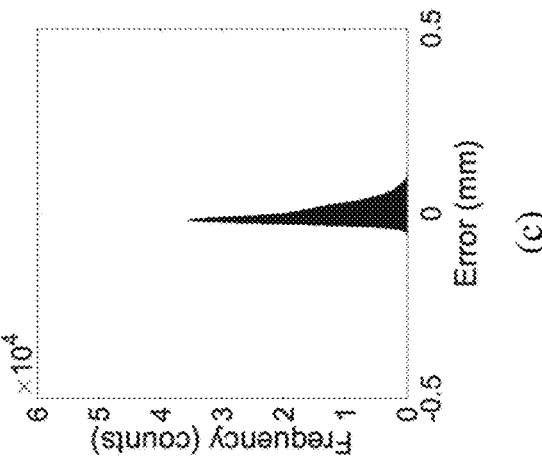
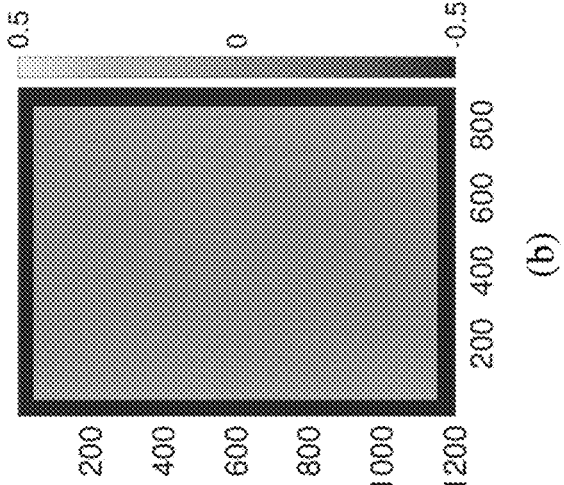
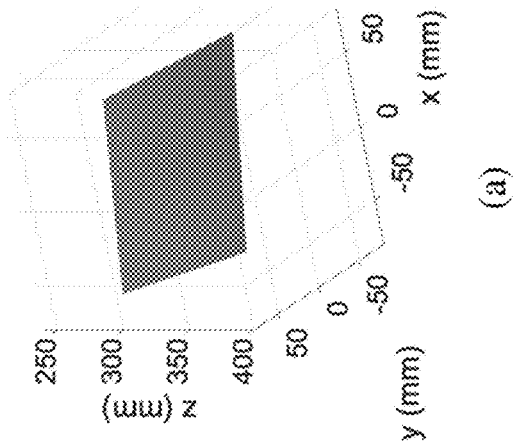
FIG. 15

SYSTEMS, METHODS, AND MEDIA FOR CALIBRATING STRUCTURED LIGHT CAMERA SYSTEMS

CROSS-REFERENCE TO RELATED APPLICATIONS

This application claims priority to and the benefit of U.S. Provisional Application No. 63/500,077, filed May 4, 2023, the entire contents of which are herein incorporated by reference for all purposes.

STATEMENT REGARDING FEDERALLY SPONSORED RESEARCH OR DEVELOPMENT

This invention was made with government support under 2019-R2-CX-0069 awarded by the National Institute of Justice. The government has certain rights in the invention.

TECHNICAL FIELD

This disclosure relates to the field of imaging. In some particular examples, this disclosure relates to the field of three-dimensional optical metrology using structured light.

BACKGROUND

Three-dimensional (3D) optical metrology has grown in importance from the manufacturing industry to numerous other disciplines ranging from law enforcement to health-care. Structured light techniques are a type of 3D optical imaging technology that has offered certain advantages in some applications. Though these technologies offer advantages (e.g., low cost, flexibility, etc.) there are countervailing complexities involved that at times can inhibit their use in new applications.

For example, despite progress and advancements in 3D optical imaging in general, calibrating structured light systems in a way that produces reliable accuracy sufficient to the particular application at hand remains one of the most challenging issues. Accordingly, there exists a need for systems, methods, and media for accurately, efficiently, and reliably calibrating structured light systems.

SUMMARY

The present disclosure addresses these and other needs by presenting systems, methods, and media for recurrent neural networks for calibrating structured light camera systems.

According to one aspect of the present disclosure, a method for calibrating a structured light camera system is provided. The method comprises receiving, from at least two cameras, a first plurality of images of a predetermined first pattern presented on a flat panel display; calibrating the at least two cameras using the first plurality of images and features of the predetermined first pattern; causing a light source to emit a series of second patterns toward a scene including a flat surface; receiving, from the at least two cameras, a second plurality of images of the series of second patterns projected on the flat surface; and calibrating the light source using the second plurality of images and features of the series of second patterns.

According to another aspect of the present disclosure, a system for calibrating a structured light camera system is provided. The system comprises a light source; a first camera comprising a first image sensor and a first lens; a second camera comprising a second image sensor and a second lens; and at least one hardware processor that is programmed to receive, from the first image sensor and the second image sensor, a first plurality of images of a predetermined first pattern presented on a flat panel display, calibrate the first camera and the second camera using the first plurality of images and features of the predetermined first pattern, cause the light source to emit a series of second patterns toward a scene including a flat surface, receive, from the first image sensor and the second image sensor, a second plurality of images of the series of second patterns projected on the flat surface, and calibrate the light source using the second plurality of images and features of the series of second patterns.

According to another aspect of the present disclosure, a non-transitory computer readable medium is provided. The non-transitory computer readable medium stores computer executable instructions that, when executed by a processor, cause the processor to perform operations comprising receiving, from at least two cameras, a first plurality of images of a predetermined first pattern presented on a flat panel display; calibrating the at least two cameras using the first plurality of images and features of the predetermined first pattern; causing a light source to emit a series of second patterns toward a scene including a flat surface; receiving, from the at least two cameras, a second plurality of images of the series of second patterns projected on the flat surface; and calibrating the light source using the second plurality of images and features of the series of second patterns.

Any of the above aspects may comprise causing the flat panel display to present the predetermined first pattern. In any of the above aspects, calibrating the at least two cameras may comprise calculating nonlinear lens distortions for each of the at least two cameras. In any of the above aspects, calibrating the light source using the second plurality of images and features of the series of second patterns may comprise calculating nonlinear lens distortions for the light source. In any of the above aspects, calibrating the light source using the second plurality of images and features of the series of second patterns may comprise constructing an ideal 3D plane and computing horizontal and vertical phase maps of the flat surface with the series of second patterns projected thereon. In any of the above aspects, respective ones of the first plurality of images may correspond to the predetermined first pattern imaged from different positions. In any of the above aspects, the series of second patterns may include horizontal and vertical fringe patterns. In any of the above aspects, the flat surface may be a featureless surface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows an example of a process for calibrating structured light camera systems in accordance with some aspects of the disclosed subject matter.

FIG. 7 shows an example of representative points in different spaces in accordance with some aspects of the disclosed subject matter.

FIG. 8 shows an example of flat surface measurement results obtained before calibrating for projector lens distortions in a structured light camera system in accordance with some aspects of the disclosed subject matter.

FIG. 9 shows an example of flat surface measurement results obtained after calibrating for projector lens distortions in a structured light camera system in accordance with some aspects of the disclosed subject matter.

FIG. 10 shows a table of different testing planes and measurement errors before calibrating for projector lens distortions in a structured light camera system in accordance with some aspects of the disclosed subject matter.

FIG. 11 shows a table of different testing planes and measurement errors after calibrating for projector lens distortions in a structured light camera system in accordance with some aspects of the disclosed subject matter.

FIG. 12 shows an example of flat surface measurement results obtained using a polynomial model for a large field of view in a structured light camera system in accordance with some aspects of the disclosed subject matter.

FIG. 14 shows an example of flat surface measurement results obtained using a polynomial model for a smaller field of view in a structured light camera system in accordance with some aspects of the disclosed subject matter.

FIG. 15 shows an example of flat surface measurement results obtained using a fractional model in a structured light camera system in accordance with some aspects of the disclosed subject matter.

DETAILED DESCRIPTION

Figure 1:
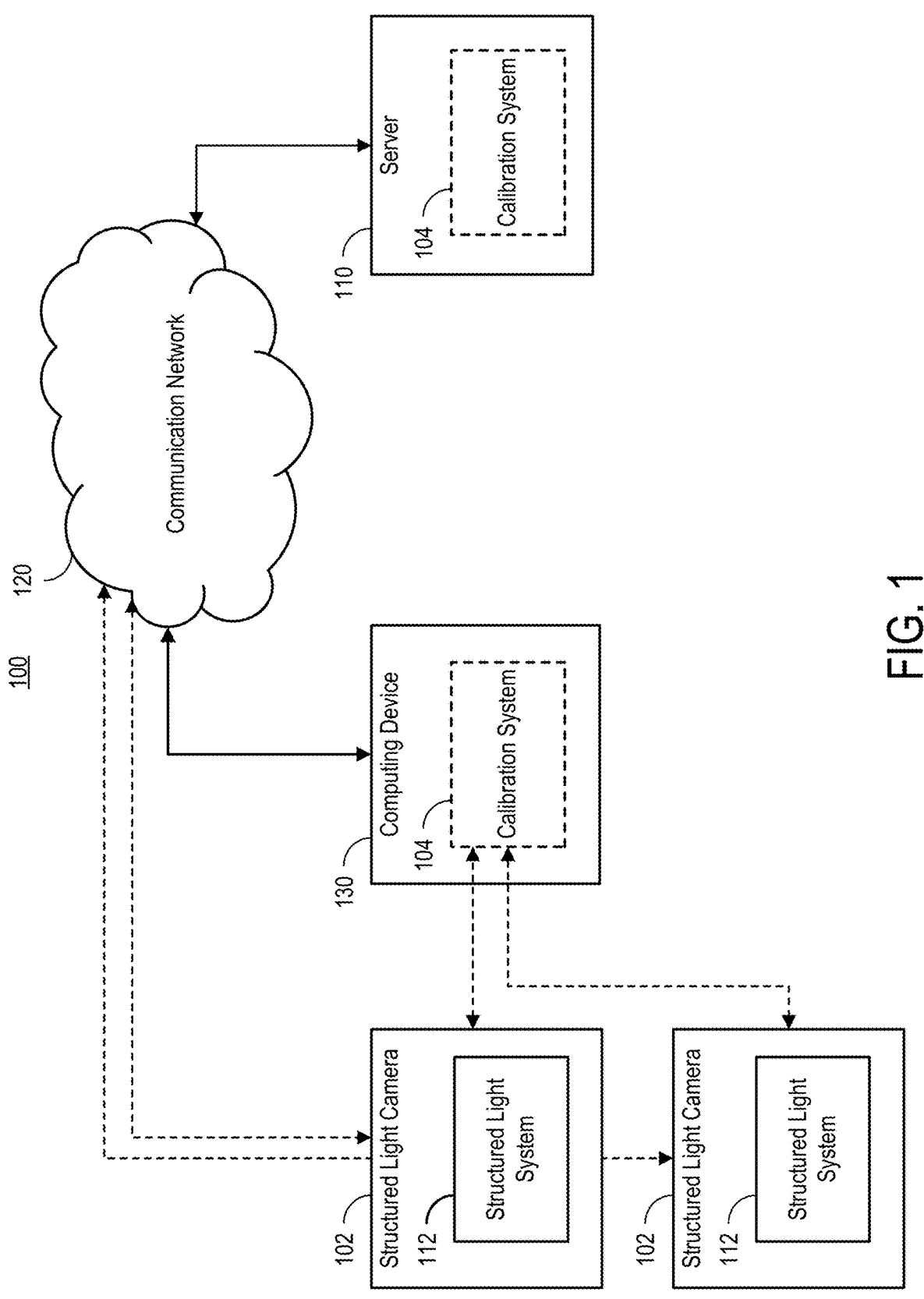
FIG. 1 shows an example of a system for calibrating structured light camera systems in accordance with some aspects of the disclosed subject matter.

The detailed description set forth below in connection with the appended drawings is intended as a description of various configurations and is not intended to represent the only configurations in which the subject matter described herein may be practiced. The detailed description includes specific details to provide a thorough understanding of various aspects of the present disclosure. However, it will be apparent to those skilled in the art that the various features, concepts, and aspects described herein may be implemented and practiced without these specific details.

The present disclosure may be implemented on or with the use of computing devices including control units, processors, and/or memory elements in some examples. As used herein, a "control unit" may be any computing device configured to send and/or receive information (e.g., including instructions) to/from various systems and/or devices. A control unit may comprise processing circuitry configured to execute operating routine(s) stored in a memory. The control unit may comprise, for example, a processor, microcontroller, application-specific integrated circuit (ASIC), field-programmable gate array (FPGA), and the like, any other digital and/or analog components, as well as combinations of the foregoing, and may further comprise inputs and outputs for processing control instructions, control signals, drive signals, power signals, sensor signals, and the like. All such computing devices and environments are intended to fall within the meaning of the term "controller," "control unit," "processor," or "processing circuitry" as used herein unless a different meaning is explicitly provided or otherwise clear from the context. The term "control unit" is not limited to a single device with a single processor, but may encompass multiple devices (e.g., computers) linked in a system, devices with multiple processors, special purpose devices, devices with various peripherals and input and output devices, software acting as a computer or server, and combinations of the above. In some implementations, the control unit may be configured to implement cloud processing, for example by invoking a remote processor.

Moreover, as used herein, the term "processor" may include one or more individual electronic processors, each of which may include one or more processing cores, and/or one or more programmable hardware elements. The processor may be or include any type of electronic processing device, including but not limited to central processing units (CPUs), graphics processing units (GPUs), ASICs, FPGAs, micro-controllers, digital signal processors (DSPs), or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations described herein may be performed by any one or more of the microprocessors or processing cores, in series or parallel, in any combination.

As used herein, the term "memory" may be any storage medium, including a non-volatile medium, e.g., a magnetic media or hard disk, optical storage, or flash memory, including read-only memory (ROM), electrically programmable ROM (EPROM), electrically erasable programmable ROM (EEPROM); a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc.; on-chip memory; and/or an installation medium where appropriate, such as software media, e.g., a CD-ROM, a DVD-ROM, a Blu-ray disc, or floppy disks, on which programs may be stored and/or data communications may be buffered. The term "memory" may also include other types of memory or combinations thereof. For the avoidance of doubt, cloud storage is contemplated in the definition of memory.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

The following discussion is presented to enable a person skilled in the art to make and use aspects of the invention. Various modifications to the illustrated aspects will be readily apparent to those skilled in the art, and the generic principles herein can be applied to other aspects and applications without departing from aspects of the invention. Thus, aspects of the invention are not intended to be limited to aspects shown but are to be accorded the widest scope consistent with the principles and features disclosed herein. The following detailed description is to be read with reference to the figures, in which like elements in different figures have like reference numerals. The figures, which are not necessarily to scale, depict selected aspects and are not intended to limit the scope of aspects of the invention. Skilled artisans will recognize the examples provided herein have many useful alternatives and fall within the scope of aspects of the invention.

In accordance with various aspects, mechanisms described herein can be used to implement techniques for structured light system calibration that can eliminate the need for calibration targets with physical features. In some embodiments, a digital display (e.g., a flat panel display, such as a liquid crystal display (LCD) screen, and organic light emitting display (OLED) screen, a plasma display screen, a quantum dot display screen, etc.) can be used to present a digital feature pattern for camera intrinsic calibration, while a flat surface (e.g., a mirror) can be used for projector intrinsic and extrinsic calibration. To carry out such calibration, a secondary camera can be used to facilitate techniques described herein. Because no specially made calibration targets with real physical features are required for the entire calibration process, mechanisms described herein can offer greater flexibility and simplicity in achieving accurate calibration for structured light systems. Experimental results described below in connection with FIGS. 6-18 demonstrate the success of techniques implemented in accordance with some embodiments of the disclosed subject matter.

Structured light system calibration techniques can be broadly classified into three categories: the reference-plane-based techniques, the mathematical model techniques, and the hybrid techniques. The reference plane techniques calibrate the system by measuring a flat surface without features and then develop the relationship between the depth and the structured pattern deformation for each pixel. These techniques can be used for structured light systems using telecentric lenses. However, such techniques often requires a high precision translational stage to calibrate a system with a lens that can be modeled as a pinhole lens.

In a comparative example, a calibration technique has been described that allows flexibly moving a calibration target with distinct features. This technique essentially describes the camera lens as a pinhole model, and the calibration techniques can be used to estimate linear transformations and lens distortions. This camera calibration technique has been extended to structured light system calibration by facilitating the projector to be modeled as "capturing" images like a camera. Such a lens distortion model may work for a typical imaging system where the optical axis is near the center of the lens, but may have problems for an off-axis imaging system such as a typical projector.

The hybrid techniques attempt to achieve higher calibration accuracy or flexibility by combining reference-plane-based techniques and mathematical model techniques. In another comparative example, a technique has been described that takes advantage of the lens model and the calibration approach for initial calibration, measures a flat reference surface to determine the pixel-wise error functions to correct each coordinate for each pixel, and then establishes the pixel-wise functions between each coordinate and the phase. This technique can improve other comparative calibration techniques especially for large field of view (FOV) systems. However, if the initial calibration is not good enough or the calibration target and the flat surface have different qualities, it is difficult to determine accurate error from the flat surface measurement. In other comparative examples, techniques that estimate the pixel-wise functions between each coordinate and the phase by determining 3D coordinates of the calibration target and capturing the phase map simultaneously are described. Because calibration feature points are used in the process, the calibration target 3D reconstruction is only as accurate as the calibration target is made. One drawback of this techniques is that the high contrast edge of calibration features causes phase error and thus calibration error if such areas are not completely pre-treated.

Comparative techniques for calibrating structured light systems with pinhole lenses either require a precisely made calibration target with real physical features and/or an expensive high-precision translation stage. In some examples, mechanisms described herein can address existing challenges using commercially available hardware. For example, in some embodiments, mechanisms described herein can use a digital display (e.g., a flat panel display, such as an LCD screen, an OLED screen, a plasma display screen, a quantum dot display screen, etc.) to display a calibration feature image for camera calibration and a flat surface (e.g., the back side of a mirror) as a reference flat surface for projector and projector-to-camera transformation calibration. Additionally, in some examples, a second camera can be used to facilitate the calibration process, and can be detached after calibration (e.g., to be used in another calibration and/or in another structured light system). Additionally, in some examples, mechanisms described herein can be used to implement a computational framework that can facilitate the use of existing camera and stereo calibration toolbox available in open-source software packages, such as OpenCV. Experimental results described below in connection with FIGS. 6-18 demonstrate that mechanisms described herein can accurately calibrate structured light systems.

In some examples, mechanisms described herein can be used to implement techniques for calibrating a structured light system without using any physically made features. Compared to the comparative techniques, mechanisms described herein can offer significant advantages. For example, the calibration techniques described herein do not require new optimization algorithms for lens intrinsic and extrinsic parameters, or distortions estimation, making the techniques relatively easy to implement. As another example, the calibration techniques set forth herein do not require a highly precise calibration target with physical features, making the techniques more flexible than comparative calibration techniques. As described below, experimental results demonstrate the feasibility of using mechanisms described herein with a stereo reconstruction model. Additionally, in some examples, mechanisms described herein can be used with any of the pixel-wise models for more accurate structured light system calibration.

FIG. 1 shows an example of a system for calibrating structured light camera systems in accordance with some aspects of the present disclosure. As shown in FIG. 1, at least structured light camera 102 can execute one or more applications, such as a structured light system 112, to generate 3D depth data from one or more images of a scene captured during projection of a pattern onto the scene.

In some examples, a computing device 130 and/or a server 110 (or other processing unit) can execute one or more applications, such as a calibration system 104, to cause structured light cameras 102 to capture images of a scene that includes a digitally rendered target, to perform a stereoscopic (or other) calibration technique using the images of the digitally rendered target to calibrate the structured light cameras 102, to cause structured light cameras 102 to capture images of a different scene using one or more patterns (e.g., fringe patterns), and to perform a stereoscopic (or other) calibration technique using the images of the fringe patterns to calibrate a projector associated with one of the structured light cameras 102. The calibration system 104 can provide a user interface (e.g., a graphical user interface (GUI)) and/or can communicate with a computing device providing a user interface (e.g., via an application program interface (API)), and can coordinate operations of various devices (e.g., structured light cameras 102, computing device 110, server 130, etc.).

In some examples, server 110, computing system 130, and/or calibration system 104 can receive information and/or or input over a communication network 120. Such information can be received from any suitable device, such as structured light cameras 102, computing device 130, and/or other data sources. For example, computing device 130 can receive input through an application (e.g., a client portion of calibration system 104) being executed by computing device 130, such as by receiving input via a user input device (e.g., a keyboard, a mouse, a touchscreen, etc.). In such an example, computing device 130 can communicate the input over communication network 120 to server 102 (or another server that can provide the input to server 102). As another example, computing device 130 can provide input via a user interface provided by server 102 and/or another server. In a more particular example, computing device 130 can access a web page (or other user interface) provided by server 102, and can use the web page to provide the input. Additionally or alternatively, in some examples, server 102 and/or another server can provide the input. In some examples, calibration system 104 can be executed entirely or partially locally by computing device 130.

The communication network 120 can be any suitable communication network or combination of communication networks. For example, communication network 120 can include a communications over a wireless protocol such as a Wi-Fi protocol (which can include one or more wireless routers, one or more switches, etc.), a peer-to-peer protocol (e.g., Bluetooth, Near Field Communication (NFC), etc.), and/or a cellular protocol (e.g., a 3G protocol, a 4G protocol, a 5G protocol, etc., complying with any suitable standard, such as CDMA, GSM, LTE, LTE Advanced, 5G NR, etc.); communications over a wired protocol such as an Ethernet cable, an optical fiber, a Universal Serial Bus (USB) cable; or combinations thereof. In some examples, communication network 120 can be a local area network (LAN), a wide area network (WAN), a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc. In some embodiments, server 110 and/or computing device 130 can be any suitable computing device or combination of devices, such as a desktop computer, a laptop computer, a smartphone, a tablet computer, a wearable computer, a server computer, a virtual machine being executed by a physical computing device, etc.

In some examples, structured light camera 102 can be any suitable type of structured light camera, which can include at least one image sensor and a light source configured to project a particular pattern or series of patterns onto a scene (e.g., as described below in connection with FIG. 3). The light source may be a laser light source, a light emitting diode (LED), a quantum dot, and the like. The light source may emit electromagnetic radiation that is visible to the human eye (i.e., in the visible wavelength range) or invisible to the human eye (e.g., in the near-infrared (NIR) and/or infrared (IR) wavelength range). The image sensor may be based on a complementary metal-oxide-semiconductor (CMOS) architecture, a charge coupled device (CCD) architecture, or any other architecture capable of converting incident electromagnetic radiation into electrical signals, and is sensitive to wavelengths including the electromagnetic radiation emitted by the light source.

Figure 2:
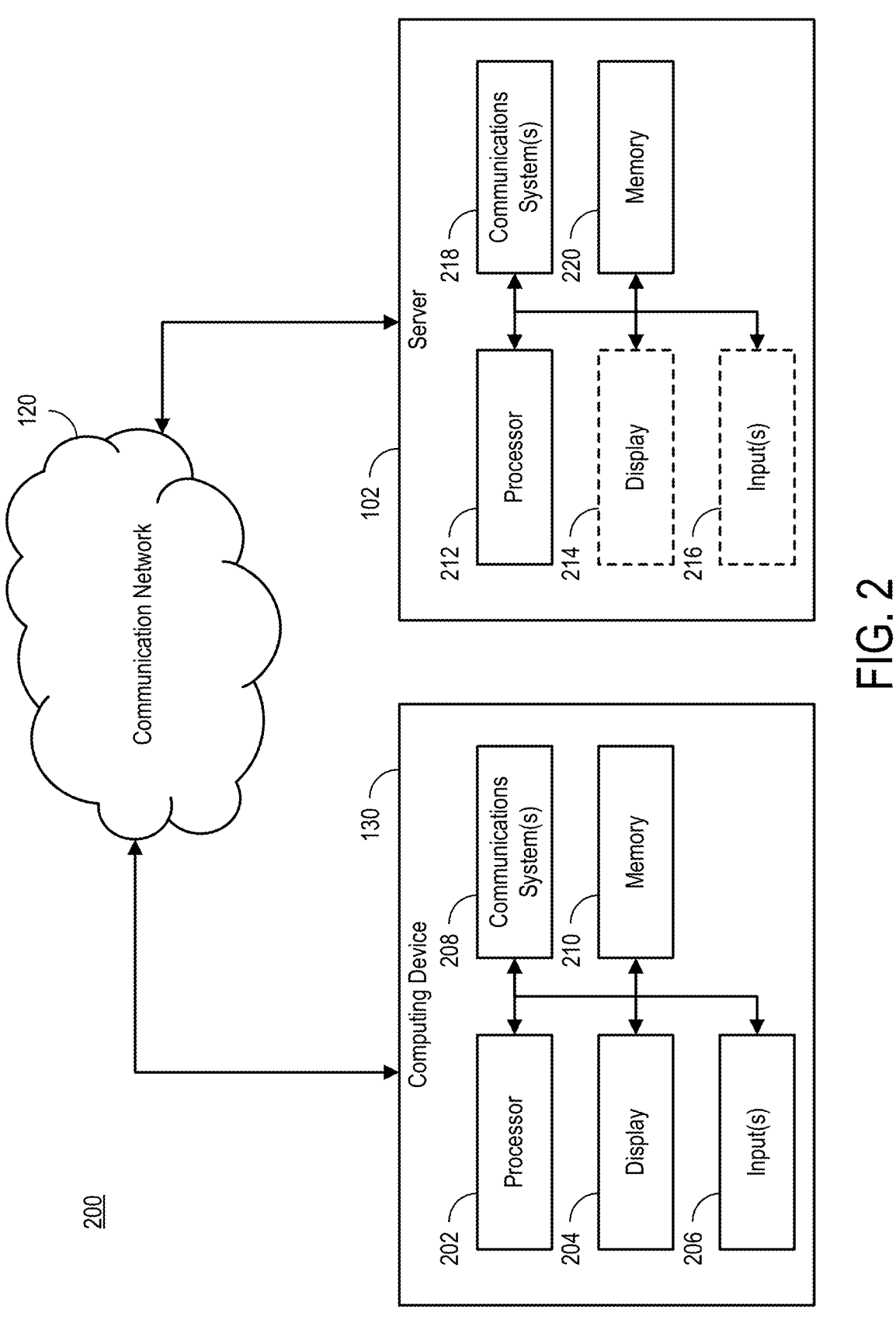
FIG. 2 shows an example of hardware that can be used to implement a server and a computing device in accordance with some aspects of the disclosed subject matter.

FIG. 2 shows an example of hardware that can be used to implement a server and a computing device in accordance with some aspects of the disclosed subject matter. As shown in FIG. 2, in some examples, computing device 130 can include a processor 202, a display 204, one or more inputs 206, one or more communication systems 208, and/or memory 210. In some embodiments, processor 202 can be any suitable hardware processor or combination of processors, such as a CPU, an accelerated processing unit (APU), a GPU, an FPGA, an ASIC, etc. In some examples, display 204 can include any suitable display devices, such as a computer monitor, a touchscreen, a television, etc. In some examples, inputs 206 can include any suitable input devices and/or sensors that can be used to receive user input, such as a keyboard, a mouse, a touchscreen, a microphone, a camera, etc.

Communications systems 208 can include any suitable hardware, firmware, and/or software for communicating information over communication network 120 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

Memory 210 can include any suitable storage device or devices that can be used to store instructions, values, etc., that can be used, for example, by processor 202 to present content using display 204, to communicate with structured light cameras 102 and/or to communicate with server 110 via communications system(s) 208, etc. Memory 210 can include any suitable volatile memory, non-volatile memory, storage, or any suitable combination thereof. For example, memory 210 can include RAM, ROM, EEPROM, one or more flash drives, one or more hard disks, one or more solid state drives, one or more optical drives, etc. In some embodiments, memory 210 can have encoded thereon a computer program for controlling operation of computing device 130. In such embodiments, processor 202 can execute at least a portion of the computer program to present content (e.g., user interfaces, tables, graphics, etc.), receive information (e.g., images) from structured light cameras 102, receive information from server 110, transmit information to server 110, etc.

Server 110 (see FIG. 1) can be implemented using one or more server devices 102 that each can include a processor 212, a display 214, one or more inputs 216, one or more communications systems 218, and/or memory 220. In some embodiments, processor 212 can be any suitable hardware processor or combination of processors, such as a CPU, an APU, a GPU, an FPGA, an ASIC, etc. In some embodiments, display 214 can include any suitable display devices, such as a computer monitor, a touchscreen, a television, etc. In some embodiments, inputs 216 can include any suitable input devices and/or sensors that can be used to receive user input, such as a keyboard, a mouse, a touchscreen, a microphone, etc.

In some examples, communications systems 218 can include any suitable hardware, firmware, and/or software for communicating information over communication network 120 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

Memory 220 can include any suitable storage device or devices that can be used to store instructions, values, etc., that can be used, for example, by processor 212 to present content using display 214, to communicate with one or more structured light cameras 102, to communicate with one or more computing devices 130, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 110. In such examples, processor 212 can execute at least a portion of the server program to transmit information and/or content (e.g., a user interface, calibration results, etc.) to one or more structured light cameras 102 and/or one or more computing devices 130, receive information and/or content from one or more structured light cameras 102 and/or one or more computing devices 130, receive instructions from one or more devices (e.g., a personal computer, a laptop computer, a tablet computer, a smartphone, etc.), etc.

Figure 3:
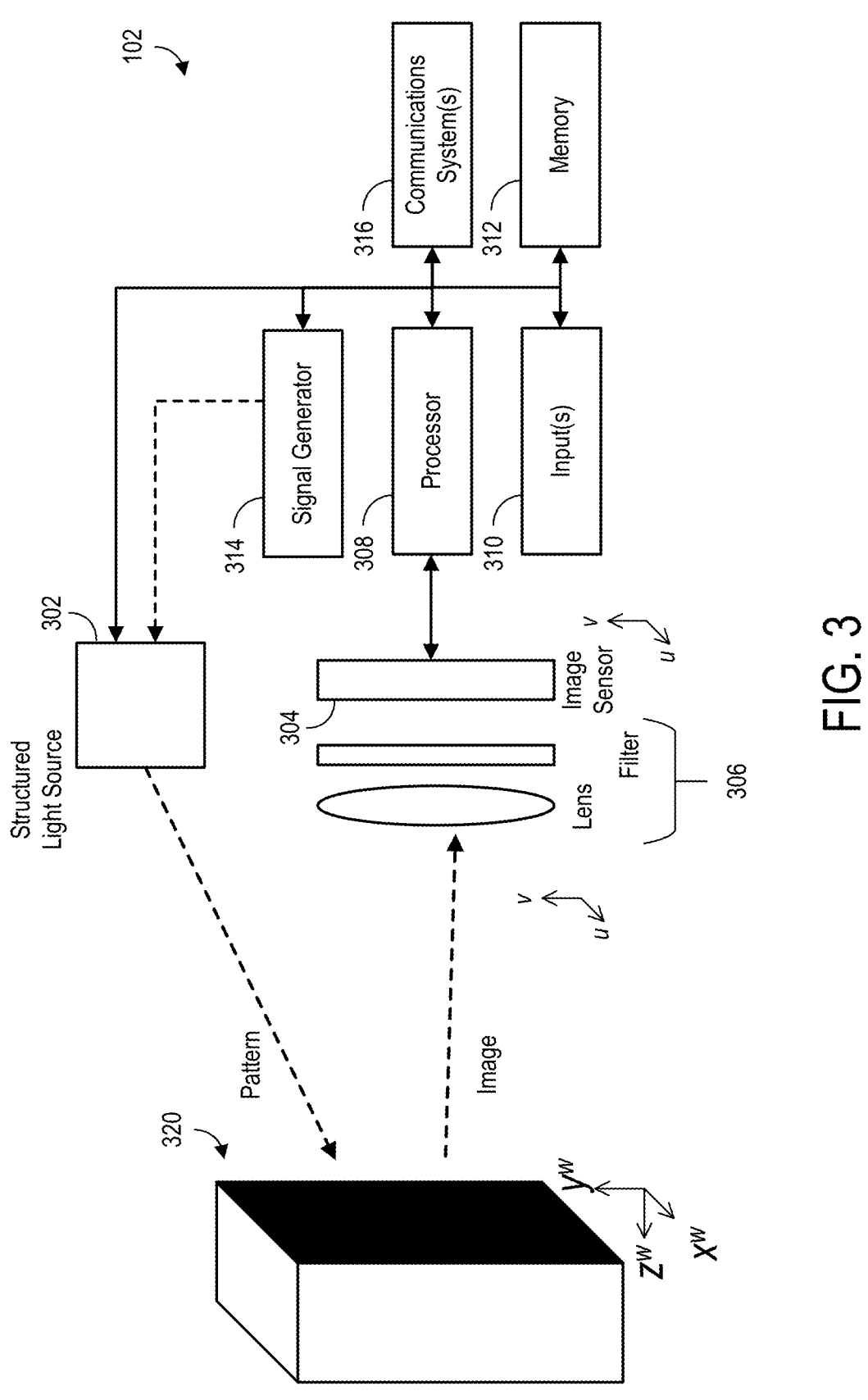
FIG. 3 shows an example of hardware that can be used to implement a structured light camera system in accordance with some aspects of the disclosed subject matter.

FIG. 3 shows an example 300 of hardware that can be used to implement a structured light camera system 102 in accordance with some embodiments of the disclosed subject matter. As illustrated in FIG. 3, structured light camera system 102 can include a structured light source 302; an image sensor 304; optics 306 (which can include, for example, a lens, a filter, etc.); a processor 308 for controlling operations of structured light camera system 102 which can include any suitable hardware processor (e.g., a microprocessor, digital signal processor, a microcontroller, an image processor, one or more of which can be implemented using an FPGA or an ASIC, a CPU, an APU, a GPU, etc., or combination of hardware processors); an input device 310 (such as a shutter button, a menu button, a microphone, a touchscreen, a mouse, etc.) for accepting input from a user and/or from the environment; memory 312; a signal generator 314 for generating one or more modulation signals for driving structured light source 302 (e.g., if light source 302 is configured to generate arbitrary patterns, rather than a single fixed pattern); and a communication system or systems 316 for allowing communication between processor 308 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link and/or a communication network (e.g., communication network 120).

Memory 312 can store pixel values output by image sensor 304, etc. Memory 312 can include a storage device (e.g., a hard disk, a solid state drive, a Blu-ray disc, a DVD, RAM, ROM, EEPROM, etc.) for storing a computer program for controlling processor 308. In some examples, memory 312 can include instructions for causing processor 308 to execute processes associated with the mechanisms described herein, such as processes described below in connection with FIG. 5.

Light source 302 can be any suitable light source that can be configured to emit patterned light toward a scene 320. In some examples, light source 302 can be implemented using one or more point light sources (e.g., a laser diode, an LED, etc.) and one or more masks (e.g., a transparency, a diffractive optical element, etc.). In some such examples, light source 302 can be configured to emit patterned light toward scene 320 using a fixed mask, a diffractive optical element, and/or any other suitable device that can cause light source 302 to produce a particular pattern upon activation. For example, light source 302 can include one or more LEDs, one or more laser diodes, one or more lamps, and/or any other suitable light source that produces light that is transmitted through the fixed mask or diffractive element and onto the scene, thereby producing a particular pattern of pattern features that are projected onto objects in the scene.

Additionally or alternatively, in some examples, light source 302 can be configured to emit patterned light toward scene 320 in accordance with a modulation signal (e.g., M(x)) received from signal generator 316. For example, light source 302 can include one or more LEDs, one or more laser diodes, one or more lamps, and/or any other suitable light source that can be selectively activated or otherwise modulated to produce a particular pattern specified by the modulation signal. Light source 302 can emit light at any suitable wavelength or combination of wavelengths. For example, light source 302 can emit visible light, IR light, NIR light, etc. In some examples, light source 302 can be configured to emit light with a pattern that varies along multiple dimensions (e.g., to produce cross-shaped pattern features). For example, light source 302 can include (or be associated with) a spatial light modulator (SLM) using one or more transmissive light crystal (LC) modulation techniques, one or more reflective liquid crystal on silicon (LCoS) modulation techniques, one or more digital light processing (DLP) modulation techniques (e.g., using micro mirrors that can be selectively oriented to emit light toward the scene or inhibit light from being emitted toward the scene). In some examples, light source 302 can include an array of light sources (e.g., LEDs, laser diodes, etc.) that can be controlled (e.g., individually addressed, addressed by column, etc.) to create a particular pattern of varying intensity across multiple dimensions of scene 320. In some examples, light source 302 can be implemented using a scanning laser beam that is controlled to vary intensity as it is scanned across the scene.

In some examples, image sensor 304 can be any suitable image sensor that can receive light reflected by scene 320, such as a CCD image sensor, a CMOS image sensor, etc. While only one image sensor 304 is illustrated in FIG. 3, in practical implementations structured light camera system 102 may include a plurality of image sensors 304. In such implementations, each image sensor 304 may be configured with its own optics 306 and/or may be configured to communicate with its own processor 308 or with a common processor 308 (or combinations thereof).

Optics 306 can include optics for focusing light received from scene 320, one or more bandpass filters (e.g., narrow bandpass filters) centered around a wavelength(s) of light emitted by light source 302, one or more longpass filters, one or more shortpass filters, any other suitable optics, and/or any suitable combination thereof. In some examples, a single filter can be used for the entire area of image sensor 304 and/or multiple filters can be used that are each associated with a smaller area of image sensor 304 (e.g., with individual pixels or groups of pixels).

Signal generator 314 can be one or more signal generators that can generate signals to control light source 302 using a modulation signal. As described above in connection with light source 302, in some examples (e.g., in which a fixed mask or diffractive optical element is used), the modulation signal can be a signal that indicates whether light source 302 is to be activated or not activated (e.g., using a binary signal). Alternatively, in some examples (e.g., in which a projector can generate different patterns), the modulation signal can be a signal that encodes a selected pattern. Although a single signal generator is shown in FIG. 3, any suitable number of signal generators can be used in some implementations. Additionally, in some examples, signal generator 314 can be implemented using any suitable number of specialized analog circuits each configured to output a signal that can be used to control a spatially varying projection of light onto a scene (e.g., scene 320).

Structured light camera system 102 can communicate with a remote device over a network (e.g., communication network 120) using communication system(s) 316 and a communication link. Additionally or alternatively, structured light camera system 102 can be included as part of another device, such as an automated system, a semi-automated system, a security system, a smartphone, a tablet computer, a laptop computer, etc. Parts of structured light camera system 102 can be shared with a device within which structured light camera system 102 is integrated. For example, if structured light camera system 102 is integrated with an automated industrial inspection system, processor 308 can be a processor of the automated system and can be used to control operation of structured light camera system 102.

Structured light camera system 102 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 316 via a communication link can be carried out using any suitable network (e.g., communication network 120). The communications link can include any communication links suitable for communicating data between system 300 and another device, such as a network link, a dial-up link, a wireless link, a hard-wired link, any other suitable communication link, or any suitable combination of such links.

Figure 4:
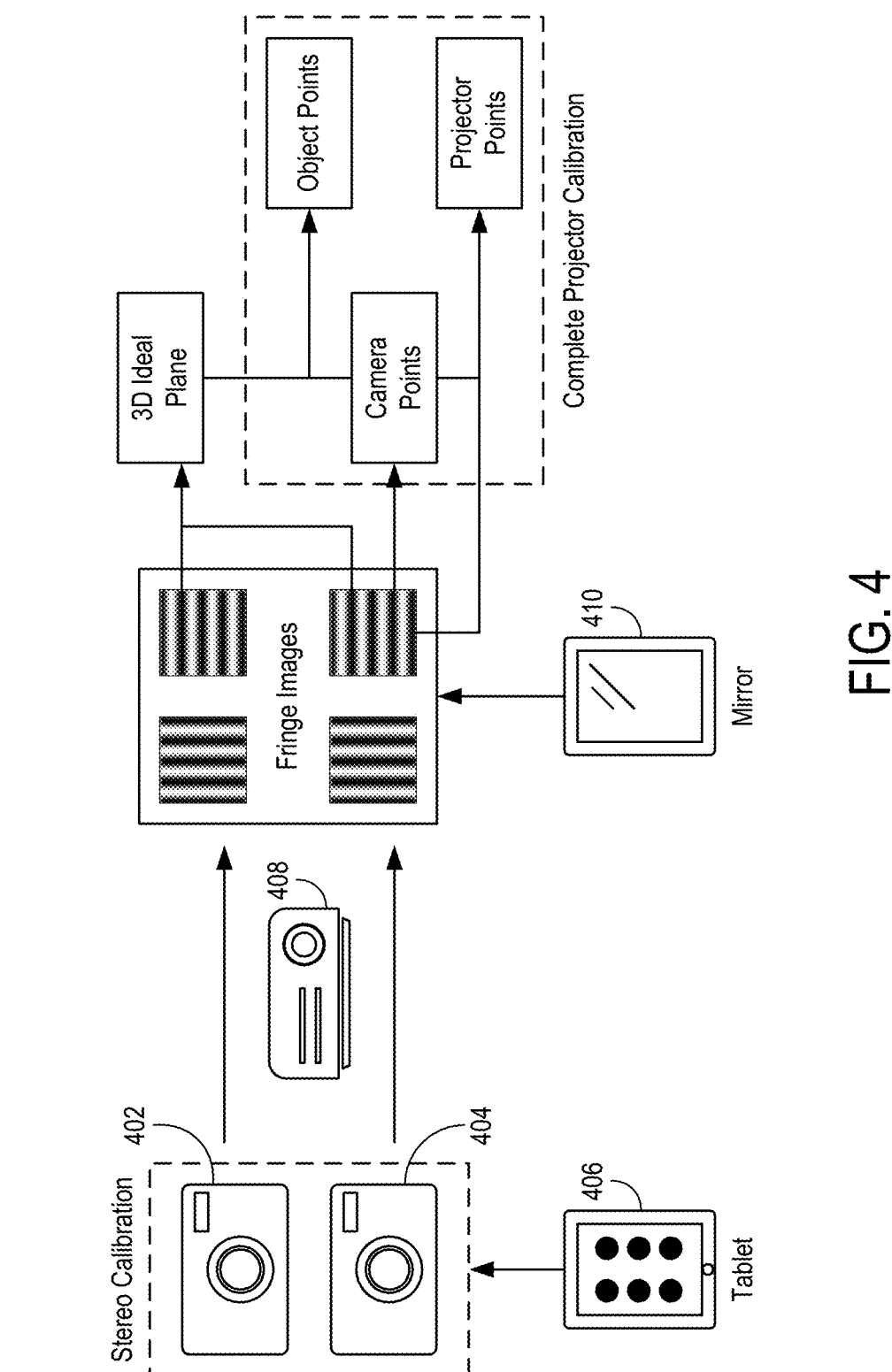
FIG. 4 shows an example of a flow for calibrating structured light camera systems in accordance with some aspects of the disclosed subject matter.

FIG. 4 shows an example of a flow for calibrating structured light camera systems in accordance with some aspects of the disclosed subject matter. As shown in FIG. 4, various devices can be used in connection with a calibration framework implemented in accordance with some aspects of the disclosed subject matter. For example, a secondary camera 404 (referred to as Camera 2) can be first added to the structured light system 400 to form a stereo vision system with the structured light system camera 402 (referred to as Camera 1). Note that both cameras 402 and 404 can be individual structured light camera systems (e.g., structured light camera systems 102 as illustrated in FIG. 3) or can be a combined structured light camera system (e.g., structured light camera system 102 with multiple image sensors).

Structured light system 406 further includes a flat panel display 406 configured to display a pattern. The flat panel display 406 may be a tablet as illustrated in FIG. 4, and/or may be a computer monitor, a laptop screen, a flat screen television, a smartphone, a personal digital assistant, and the like. In some implementations, the flat panel display 406 may be a flat surface into which the pattern is projected. Structured light system 406 includes a projector 408 includes a light source configured to emit light toward a flat surface 410. Flat surface 410 may be any surface that does not include surface features (i.e., a featureless surface), such as a mirror. The light emitted by the projector 408 may be or include a series of patterns (e.g., a series of fringe images).

Various principles associated with mechanisms described herein are described below. For example, a pinhole lens model (which may be used as a stereo vision 3D reconstruction technique), a phase-shifting algorithm, an ideal flat plane reconstruction, a virtual feature encoding and determination, and a computational framework that can be used in connection with some examples of the disclosed subject matter are described below.

Pinhole lens model: A pin-hole lens can be mathematically modeled as linear transformations and nonlinear distortions. The linear transformation describes the transformation from 3D world coordinates $(x^w, y^w, z^w)$ to 2D image coordinates (u, v) (e.g., as shown in FIG. 3) as $$s[u, v, 1]^T = A \cdot [R, t] \cdot [x^w, y^w, z^w, 1]^T \tag{1}$$

where s denotes a scaling factor, A a 3×3 intrinsic matrix, R a 3×3 rotation matrix, t a 3×1 translation vector, and T the matrix transpose. R and t are often referred to as the extrinsic parameter matrices.

The nonlinear lens distortions consider the radial and tangential distortions as $$\begin{bmatrix} \breve{u} \\ \breve{v} \end{bmatrix} = (1 + k_1 r^2 + k_2 r^4 + k_3 r^6) \begin{bmatrix} \bar{u} \\ \bar{v} \end{bmatrix} + \begin{bmatrix} 2p_1 \bar{u}\bar{v} + p_2(r^2 + 2\bar{u}^2) \\ 2p_2 \bar{u}\bar{v} + p_1(r^2 + 2\bar{v}^2) \end{bmatrix} \tag{2}$$

with $$r^2 = \bar{u}^2 + \bar{v}^2 \tag{3}$$

where $[k_1, k_2, k_3]$ are the distortion coefficients, $[p_1, p_2]$ the tangential distortion coefficients, $[\breve{u}, \breve{v}]^T$ the distorted image points, and $[\bar{u}, \bar{v}]^T$ the normalized image coordinates. Once the lens distortion coefficients are calibrated, all captured images can be undistorted first before 3D reconstruction where only the linear models are necessary.

Stereo-vision 3D reconstruction: Because all nonlinear lens distortions can be taken care of before 3D reconstruction, it is possible to determine 3D coordinates of a matched pair from two calibrated cameras under the same world coordinate system. After calibration, A, R, and t in EQ. (1) are known for each camera with four unknowns $(x^w, y^w, z^w)$ and s for these three linear equations, thus at least one constraint equation is required to solve for $(x^w, y^w, z^w)$. For a given $(u^1, v^1)$ on the first camera, if the corresponding pixel $(u^2, v^2)$ is known on the second camera, 3D coordinates can be calculated using the least squares method with 5 unknowns and 6 equations. Stereo-vision systems typically fail if the captured images does not have distinctive features, which is the case for a typical reference plane (e.g., a flat white surface). To accurately and reliably establish corresponding pairs, a phase-shifting algorithm can employed.

Phase-shifting algorithm: Phase-shifting algorithms can be used for high-accuracy 3D shape measurement because of its speed, accuracy, and resolution. The $k^{th}$ fringe image in an N-step phase-shifting algorithm with equal phase shifts can be expressed as $$I_{th} = I' + I'' \cos\left(\phi + \frac{2k\pi}{N}\right) \tag{4}$$

where I' denotes the average intensity and I" the intensity modulation. The $\phi$ can be calculated by simultaneously solving those N (N>2) equations, $$\phi = -\tan^{-1}\left[\frac{I_k \sin\left(\frac{2k\pi}{N}\right)}{I_k \cos\left(\frac{2k\pi}{N}\right)}\right] \tag{5}$$

Here, the arctangent function has $2\pi$ discontinuities that can be resolved by employing one of the phase unwrapping algorithms. The phase unwrapping process can determine the appropriate number K of $2\pi$ to be added for each point, $$\Phi = \phi + 2\pi \times \kappa \tag{6}$$

where $\Phi$ denotes the unwrapped phase without $2\pi$ discontinuities. In some examples, a gray coding technique can be used to determine $\kappa$ for each pixel. Additionally or alternatively, any other suitable set of patterns can be used to determine $\kappa$ for each pixel.

Ideal plane 3D reconstruction: To accurately determine corresponding pairs between two cameras, two orthogonal (e.g., horizontal and vertical) direction fringe patterns can be projected and captured. Because for each projected point, the phase value is uniquely defined, the corresponding point pairs $(u^1, v^1)$ and $(u^2, v^2)$ between two camera images can be determined by minimizing the phase difference. It is possible to calculate 3D coordinates (x, y, z) for each corresponding pair. This technique allows accurate measurement of a flat surface without distinctive features.

As described above, accurately calibrating a camera is nontrivial, and thus the reconstructed 3D shape may have errors. For example, the measured points may not be on a plane for planar surface measurements. If the calibration target is known to be planar, the measured data can be fit as an ideal plane function $$ax + by + c = z \tag{7}$$

and the plane normal can be denoted as a vector n=[a, b, $-1]^T$.

Assuming the world coordinate system is defined on the main camera (Camera 1) lens, and the reconstructed 3D points $(x^w, y^w, z^w)$ are in the same coordinate system (e.g., $(x^w, y^w, z^w)=(x, y, z)$). From the lens pinhole model defined in EQ. (1), for a given pixel $(u_i, v_i)$, the 3D coordinates $(x_i, y_i, z_i)$ can be solved as $$[x_i, y_i, z_i]^T = A^{-1} \cdot [u_i, v_i, 1]^T \qquad (8)$$

where $[\ ]^{-1}$ denotes the matrix inverse. Because the reconstructed $(x_i, y_i, z_i)$ may not be on the fitted plane, an additional point can be used to find the corresponding 3D points on the flat plane using EQ. (7). This point can be obtained by determining the intersection of the line defined by $(0, 0, 0)$ and $(x_i, y_i, z_i)$ and the plane function, Eq. (7). Once the ideal 3D plane is reconstructed, feature points can be encode on the plane from those feature points defined on the camera image.

Virtual feature encoding and determination: To use flexible camera calibration techniques, and the corresponding open source software packages, the calibration target is flat and the z axis aligns with the calibration target surface normal. It can also be preferable to use the same number of feature points for all calibration poses. To meet these standards, the coordinate system can be transformed such that $\hat{x}$-$\hat{y}$ plane of the world coordinate system is on the calibration target plane for each pose. It can be shown that the transformation between the transformed world coordinates $(\hat{x}, \hat{y}, \hat{z})$ and its original coordinates $(x, y, z)$ on the ideal plane is $$\begin{bmatrix} \hat{x} \\ \hat{y} \\ \hat{z} \end{bmatrix} = \begin{bmatrix} n_{11} & n_{12} & n_{13} \\ n_{21} & n_{22} & n_{23} \\ n_{31} & n_{32} & n_{33} \end{bmatrix} \begin{bmatrix} x - x_0 \\ y - y_0 \\ z - z_0 \end{bmatrix} \qquad (9)$$

where $(x_0, y_0, z_0)$ is the origin of the new coordinate system on the plane, the $\hat{z}$-axis is defined as the normalized normal of the fitted plane EQ. (7)

$$n_{\hat{z}} = [\, n_{31} \quad n_{32} \quad n_{33} \,]^T = \frac{n}{\|n\|} \qquad (10)$$

and the $\hat{x}$-axis is defined as $$n_{\hat{x}} = [\, n_{11} \quad n_{12} \quad n_{13} \,]^T = \frac{N_{\hat{x}}}{\|N_{\hat{x}}\|} \qquad (11)$$

where $\|\cdot\|$ denotes the length of a vector, and $$N_{\hat{x}} = [\, x_1 - x_0 \quad y_1 - y_0 \quad z_1 - z_0 \,]^T \qquad (12)$$

where $(x_1, y_1, z_1)$ is the point on the plane along $\hat{x}$-axis. From which we can determine the $\hat{y}$-axis as $$n_{\hat{y}} = [\, n_{21} \quad n_{22} \quad n_{23} \,]^T = n_{\hat{z}} \times n_{\hat{x}} \qquad (13)$$

where X denotes vector cross product.

For each feature point defined on the camera image, the corresponding 3D coordinates $(x, y, z)$ on the measured plane (e.g., calibration target object) can be transformed to the object feature coordinates $(\hat{x}, \hat{y}, \hat{z})$. Since the $\hat{x}$-$\hat{y}$ plane aligns with the measurement plane, $\hat{z}\equiv0$. Thus, the desired object feature point coordinates are $(\hat{x}, \hat{y}, 0)$. In the meantime, for each feature point, the corresponding projector point $(u^p, v^p)$ can be found from the captured horizontal and vertical phase maps.

For each plane measurement by stereo cameras, an ideal 3D plane can be constructed and both horizontal and vertical phase maps can be computed. A set of points on the camera captured image can be defined as feature points, the corresponding transformed object feature points can be determined using the transformed coordinates, and the corresponding projector feature points can be determined from those phase maps. Once these feature points are determined, the structured light system calibration process can follow the same process of a comparative structured light system calibration. However, the comparative calibration process requires a flat calibration target with well-defined physical features (e.g. circle patterns). Mechanisms described herein can be used with a flat plane that lacks features.

Different structured light system models: Virtual feature encoding and determination techniques described herein can facilitate calibration of all three major structured light system models: 1) the "stereo" pinhole model that performs stereo calibration between the camera and the projector; 2) the pixel-wise polynomial model; and 3) the pixel-wise rational model. The entire process for the stereo pinhole model is described above by replacing the second camera with a projector. This section thus focuses more on the latter two approaches.

Pixel-wise polynomial model: Unlike the comparative stereo model, this model does not require direct projector calibration, making it more applicable to different types of structured pattern generation techniques. In such a case, the pixel-wise relationship between $z(u, v)$ and undistorted phase $\Phi(u, v)$ can be described as $$z(u, v) = \sum_{k=0}^{3} c_k(u, v)[\Phi(u, v)]^k, \qquad (14)$$

where $c_k(u, v)$ are constants to be calibrated. Once $z(u, v)$ is known for each pixel, $x(u, v)$ and $y(u, v)$ can be determined from $$s[u, v, 1]^T = A \cdot [x, y, z]^T. \qquad (15)$$

Therefore, it is unnecessary to fit $x(u, v)$ and $y(u, v)$ as polynomial functions.

Pixel-wise fractional model: Instead of fitting as pixel-wise polynomial functions, it can be mathematically shown that if both the camera and the projector do not have nonlinear distortions, the pixel-wise relationship between $z(u, v)$ and the undistorted phase $\Phi(u, v)$ value can be modeled as a fractional function $$z(u, v) = c_0(u, v) + \frac{c_1(u, v)\Phi(u, v)}{1 + c_1(u, v)\Phi(u, v)} \qquad (16)$$

where $c_0(u, v)$, $c_1(u, v)$, and $c_2(u, v)$ are constants to be calibrated. Once $z(u, v)$ is known for each pixel, $x(u, v)$ and $y(u, v)$ can once again be determined from EQ. (15). This model also does not require direct projector calibration and is applicable to different types of structured pattern generation technique.

FIG. 5 shows an example 500 of a process for calibrating structured light camera systems in accordance with some examples of the disclosed subject matter. At 502, process 500 can include displaying a known (e.g., predetermined) pattern on using a flat panel display (e.g., a liquid crystal display (LCD), a light emitting diode (LED) display, etc.). In some examples, the pattern can include features of known physical size when presented on a display with a known size and resolution.

In some implementations, process 500 can cause the pattern to be presented using any suitable technique or combination of techniques. For example, if process 500 is being executed by a computing device having a display (e.g., a laptop computer, a tablet computer, etc.), process 500 can use the display to present the pattern. As another example, process 500 can instruct a device other than a device executing process 500 to present the pattern. In a particular example, a server or computing device executing process 500 can instruct a tablet computer to present the pattern (e.g., via a communication network, such as communication network 120).

At 504, process 500 can cause image sensors of multiple cameras arranged in a stereoscopic imaging configuration to capture images of a scene including the display presenting the pattern at various positions with respect to the cameras (e.g., in multiple poses at different distances and orientations with respect to the cameras). In some examples, process 500 can cause the image sensors to capture images using any suitable technique or combination of techniques. For example, process 500 can trigger an image capture by a CCD image sensor of a camera(s). As another example, process 500 can trigger an image capture by a CMOS image sensor of a camera(s). In some implementations, at 504, process 500 can receive the images captured by the cameras.

At 506, process 500 can calibrate the cameras based on the captured images and the known pattern using any suitable technique or combination of techniques. For example, process 500 can use techniques described above in connection with FIG. 4 to calibrate the cameras. In a particular example, process 500 can calibrate the stereo cameras using feature points shown on the display (e.g., an LCD screen). In some embodiments, process 500 can define the Camera 1 (e.g., camera 402 of FIG. 4) lens coordinate system as the world coordinate system during calibration.

At 508, process 500 can cause a light source (e.g., light source 302) to emit a series of patterns of light toward a scene that includes a flat surface (e.g., the back of a mirror), where the series of patterns can be used to determine correspondence between a camera pixel and a projector location (e.g., a projector pixel). For example, the patterns can include horizontal and vertical fringe patterns (e.g., as shown in FIG. 4). Note that any other suitable series of patterns can be used.

At 510, process 500 cause image sensors of multiple cameras arranged in the stereoscopic imaging configuration to capture images of a scene including the patterns emitted at 508 projected on the flat surface at various positions with respect to the cameras (e.g., in multiple poses at different distances and orientations with respect to the cameras). In some examples, process 500 can cause the image sensors to capture images using any suitable technique or combination of techniques. For example, process 500 can trigger an image capture by a CCD image sensor of a camera(s). As another example, process 500 can trigger an image capture by a CMOS image sensor of a camera(s). In some implementations, at 510, process 500 can receive the images captured by the cameras.

At 512, process 500 can calibrate the projector based on the images of the patterns projected at 508 that were captured at 510 by the two calibrated cameras using any suitable technique or combination of techniques. For example, process 500 can use techniques described above in connection with FIG. 4 to determine locations of points on the flat surface (e.g., in any suitable coordinates) using the stereoscopic camera system, and can use the determined points to estimate properties of the projector based on errors between distance measurements determined using images of the structured light patterns emitted at 508 and the known distances based on the stereoscopic measurements.

In some implementations, for each pose, process 500 can use images captured by both cameras of all projected fringe patterns to generate two phase maps $$(\Phi_x^1, \Phi_y^1), (\Phi_x^2, \Phi_y^2)$$

for each camera. These phase maps can be used to find corresponding pairs for these two cameras for 3D reconstruction. The reconstructed 3D points can be fitted with an ideal plane function, from which ideal 3D points for each pixel on Camera 1 can be calculated using techniques described above in connection with FIG. 4.

In some implementations, a number of feature points can be defined on the Camera 1 image for each pose. These feature points are sometimes referred to herein as "camera points" ($u^c$, $v^c$). For each camera point ($u^c$, $v^c$), the absolute phase maps, $$\Phi_x^1 \text{ and } \Phi_y^1,$$

give the corresponding projector point ($u^p$, $v^p$) as $$\begin{bmatrix} u^p \\ v^p \end{bmatrix} = \begin{bmatrix} \dfrac{\Phi_x^1(u, v)T_x}{2\pi} \\ \dfrac{\Phi_y^2(u, v)T_y}{2\pi} \end{bmatrix} \tag{17}$$

where $T_x$ and $T_y$ represents the vertical and horizontal fringe periods in pixels. These feature points are sometimes referred to herein as "projector points."

In some implementations, process 500 can compute, for each camera feature point, the (x, y, z) coordinates on the ideal calibration plane. Process 500 can then transform the (x, y, z) coordinates to the calibration target plane coordinate system to compute ($\hat{x}$, $\hat{y}$), which is the corresponding point on the object space, and is sometimes referred to herein as an "object point." Once the corresponding camera, projector and object feature points are known for a number for poses, a stereo calibration procedure (or other calibration procedure, as described above in connection with FIG. 4) can be used to estimate both intrinsic and extrinsic parameters and the distortion coefficients for the structured light system (e.g., Camera 1 and projector). In some examples, after the structured light system has been calibrated, the second camera (e.g., Camera 2) can be removed, such that the structured light system (e.g., Camera 1 and the associated structured light source) can be used to determine depths in a scene.

FIGS. 6-18 illustrate example results generated in connection with mechanisms described herein for calibrating structured light camera systems. A structured light system was assembled to experimentally verify the performance of mechanisms described herein. The hardware system included a DLP projector (model: Lightcrafter 4500), a CMOS as Camera 1 (model: FLIR Blackfly BFS-U3-50S5M), and an Arduino Uno board. A secondary CMOS camera was added as Camera 2 (model: FLIR Blackfly BFS-U3-23S3M) to facilitate the calibration process. Each camera was attached with an 8 mm lens (model: Computar M0814-MP2). The projector resolution was 912×1140, and both cameras were set to output images with a resolution of 900×1200, and the Arduino generated a 15 Hz signal to trigger the projector and both cameras to ensure they were synchronized.

To calibrate the stereo cameras, an 11-inch iPad Pro (3rd generation) was used to display 12×16 circle dots. The circle center distance was set as 90 pixels. Since the iPad resolution was 264 dot per inch (dpi), the distance between circle center was 8.6591 millimeters (mm). 60 poses were used to calibrate the stereo cameras. The OpenCV 4.20 stereo vision system calibration package was used to estimate all camera and projector parameters. For the structured light system, 18-step phase-shifting algorithm was used to create high-quality horizontal and vertical phase maps, and gray codes were used to unwrap the phase. For each pose, approximately 2500 matching pairs were detected based on the phase maps for 3D reconstruction using the estimated camera parameters.

Figure 6:
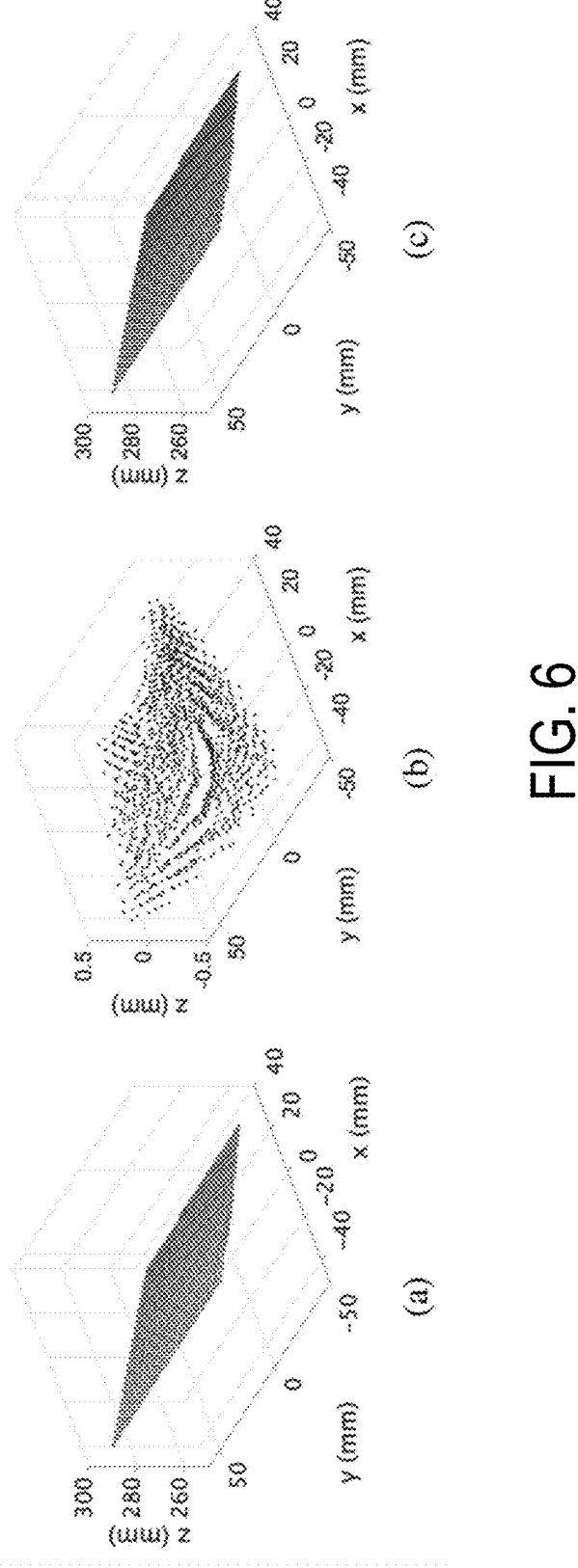
FIG. 6 shows an example of an ideal 3D plane reconstruction using stereo calibration data from multiple cameras in accordance with some aspects of the disclosed subject matter.

FIG. 6 shows an example of an ideal 3D plane reconstruction using stereo calibration data from multiple cameras in accordance with some aspects of the disclosed subject matter. FIG. 6, panel (a) shows 3D reconstructed points using stereo calibration data; FIG. 6, panel (b) shows plane fitting errors; and FIG. 6, panel (c) shows a reconstructed ideal 3D plane. As shown in FIG. 6, the reconstructed points, apparently, are not perfectly planar. These data points were fitted with an ideal plane function. For this example, the plane function was $0.5018x-0.0014y+270.6360=z$. FIG. 6 shows the plane fitting error, demonstrating that the 3D reconstructed points do not lie on the ideal plane. From the plane function, 3D coordinates for each Camera 1 pixel were reconstructed, and FIG. 6 shows those sample pixels.

FIG. 7 shows an example of representative points in different spaces in accordance with some aspects of the disclosed subject matter. FIG. 7, panel (a) shows sampled feature points on the camera image; FIG. 7, panel (b) shows mapped feature points on the projector image; and FIG. 7, panel (c) shows mapped feature points on the object plane. On Camera 1, a region was detected that has fringes, and the region was sampled with 12×16 uniformly distributed feature points, as shown in FIG. 7. These feature points were then mapped to the projector to create projector feature points shown in FIG. 7. The 3D coordinates of each pixel was then transformed to plane coordinates to create object feature points. FIG. 7 shows the corresponding object feature points.

The experimental system was used to capture 30 different poses for calibration. Note that because the camera has already been calibrated during the stereo calibration, the camera does not have to be calibrated again. In this example, the linear projector model and the camera model were chosen with the radial distortion considering $k_1$ and $k_2$. The performance of calibration techniques described herein was evaluated by measuring the flat surface at 19 different poses. For each measurement, an ideal plane was fitted and the point-wise measurement error was calculated as the shortest distance from the measured point to the fitted plane, and the sign was determined as a point below the ideal plane (e.g., being behind that target in the camera frame of reference, having a higher z coordinate) being negative and a point above the ideal plane being positive.

FIG. 8 shows an example of flat surface measurement results obtained before calibrating for projector lens distortions in a structured light camera system in accordance with some aspects of the disclosed subject matter. FIG. 8, panel (a) shows a 3D reconstructed shape; FIG. 8, panel (b) shows a flatness error map; and FIG. 8, panel (c) shows an error histogram.

One example from the standard structured light system 3D reconstruction technique is shown in FIG. 8 that only used one directional fringe patterns. FIG. 8 shows the corresponding pixel-by-pixel error map. The root-mean-square (rms) error ($\sigma$) for this pose measurement is $\sigma=0.13$ mm, which is quite small considering that the overall measurement area is approximately 165×127 $mm^2$. Note that the measured data here and those presented in the rest of the results were filtered with 5×5 Gaussian filter to reduce the most significant random noise.

FIG. 9 shows an example of flat surface measurement results obtained after calibrating for projector lens distortions in a structured light camera system in accordance with some aspects of the disclosed subject matter. FIG. 9, panel (a) shows a 3D reconstructed shape; FIG. 9, panel (b) shows a flatness error map; and FIG. 9, panel (c) shows an error histogram.

The results in FIG. 9 take account of the camera model with all nonlinear distortions and the projector model with all nonlinear distortions. As shown in FIG. 9, the same result plane measurement with the new model is shown as in FIG. 8. The measurement error is drastically reduced from $\sigma=0.13$ mm to $\sigma=0.039$ mm, indicating that the projector lens nonlinear effect cannot be ignored but can be properly estimated using techniques described herein without using physical calibration targets used in conventional calibration techniques.

FIG. 10 shows a table (Table 1) of different testing planes and measurement errors before calibrating for projector lens distortions in a structured light camera system in accordance with some aspects of the disclosed subject matter. Table 1 summarizes the data for 19 plane measurements with different orientations and positions before considering projector nonlinear distortions. For a measurement volume of $193(x)\times143(y)\times148(z)$ $mm^3$, the achieved rms errors were all below 0.20 mm with a mean value of 0.145 mm and standard deviation of 0.018 mm. These experimental results further demonstrate that calibration techniques described herein can achieve reasonably high measurement accuracy for a standard structured light system using pinhole models even without considering projector nonlinear distortions.

FIG. 11 shows a table (Table 2) of different testing planes and measurement errors after calibrating for projector lens distortions in a structured light camera system in accordance with some aspects of the disclosed subject matter. Table 2 summarizes the data for the same 19 plane measurements with different orientations and positions after considering projector nonlinear distortions. The overall measurement error was reduced substantially for all poses. The mean rms error value was reduced to 0.034 mm with a standard deviation of 0.007 mm. These experimental results further confirmed that the projector lens distortion cannot be ignored, and that techniques described herein can successfully achieve high measurement accuracy for a standard structured light system using the pinhole models.

FIG. 12 shows an example of flat surface measurement results obtained using a polynomial model for a large field of view in a structured light camera system in accordance with some aspects of the disclosed subject matter. FIG. 12, panel (a) shows a 3D reconstructed shape; FIG. 12, panel (b) shows a flatness error map; and FIG. 12, panel (c) shows an error histogram. FIG. 12 shows results generated using the pixel-wise polynomial model for both calibration and 3D reconstruction. For this calibration approach, 40 translational poses were used. Note that to ensure more coverage, pixels were kept as long as 6 or more poses had valid phase data. As shown in FIG. 12, the error map has large error one the left side.

Figure 13:
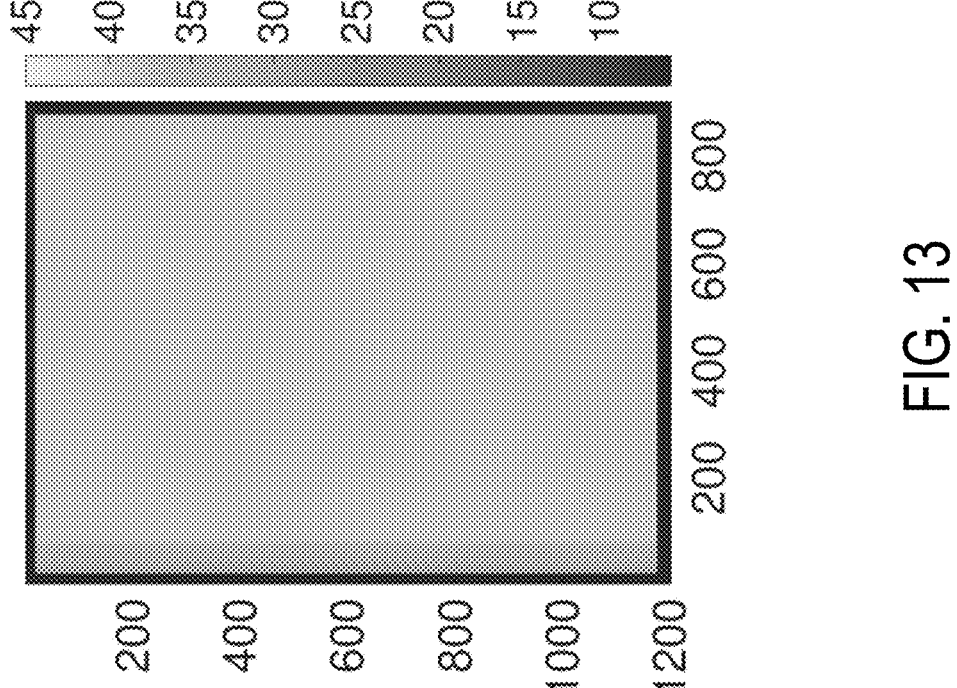
FIG. 13 shows an example of a number of poses with valid phase information surface measurement results obtained using a polynomial model for a large field of view in a structured light camera system in accordance with some aspects of the disclosed subject matter.

FIG. 13 shows an example of a number of poses with valid phase information surface measurement results obtained using a polynomial model for a large field of view in a structured light camera system in accordance with some aspects of the disclosed subject matter. To investigate left side error shown in FIG. 12, FIG. 13 shows a plot of the number of poses that have valid phase information during the calibration stage. This shows that the large error shown in FIG. 12 near the left edge directly relates to the reduced number of poses used for calibration, with the reduced number of poses leading to larger error. This may be due to the nature of polynomial fitting that works well with more data points within the calibration range, and may produce undesired artifacts when the number of fitting points is small.

FIG. 14 shows an example of flat surface measurement results obtained using a polynomial model for a smaller field of view in a structured light camera system in accordance with some aspects of the disclosed subject matter. FIG. 14, panel (a) shows a 3D reconstructed shape; FIG. 14, panel (b) shows a flatness error map; and FIG. 14, panel (c) shows an error histogram. All pixels that do not have all 40 valid points during the calibration and measurement stage were removed. FIG. 14 shows the corresponding results that has no edge artifacts. This confirms that the polynomial fitting can work well with more sampling points. However, this constraint limits the field of view (FOV) of the structured light system due to triangulation especially of the projector's FOV is not significantly larger than the camera's FOV.

FIG. 15 shows an example of flat surface measurement results obtained using a fractional model in a structured light camera system in accordance with some aspects of the disclosed subject matter. FIG. 15, panel (a) shows a 3D reconstructed shape; FIG. 15, panel (b) shows a flatness error map; and FIG. 15, panel (c) shows an error histogram. The fractional model was also evaluated for both calibration and 3D reconstruction, as shown in FIG. 15. For this calibration approach, 40 translational poses were used and points were kept if there were 6 or more poses have valid phase information. FIG. 15 shows no obvious artifacts near the left edge, demonstrating that the fractional model is likely less sensitive to the number of data points used for fitting. This advantageous feature may make it easier to achieve larger FOV higher calibration accuracy, and corresponding higher measurement accuracy.

Figure 16:
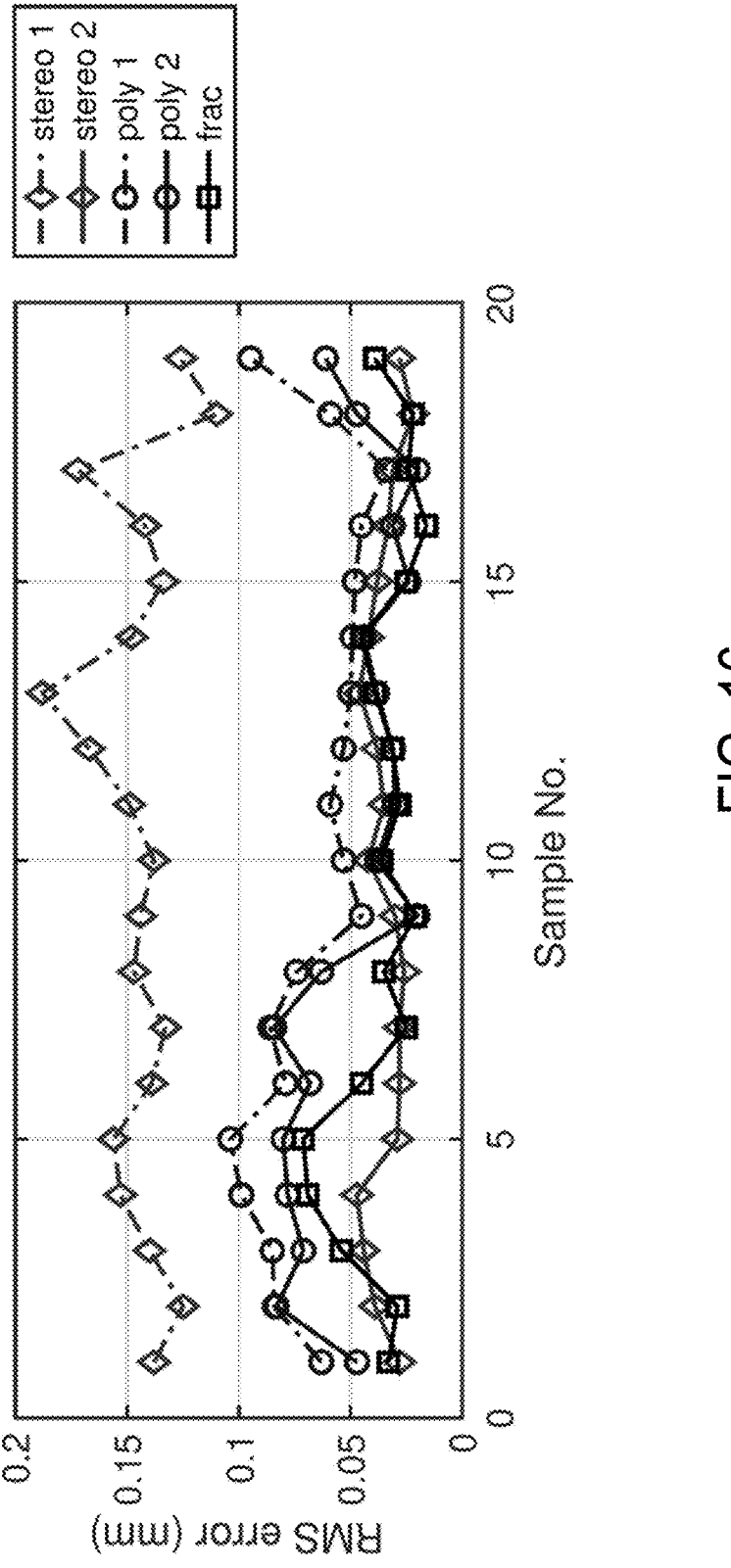
FIG. 16 shows an example of flat surface measurement errors for 19 different poses and using different models to estimate system parameters in accordance with some aspects of the disclosed subject matter.

FIG. 16 shows an example of flat surface measurement errors for 19 different poses and using different models to estimate system parameters in accordance with some aspects of the disclosed subject matter. FIG. 16 shows a comparison of flat surface measurement rms errors for all 19 different poses. Where "stereo 1: denotes the pinhole model technique; "stereo 2" denotes the pinhole model with projector lens distortions; "poly 1" denotes the polynomial model with edging artifacts; "poly 2" denotes the polynomial model without edging artifacts; and "frac" denotes the fraction model.

As illustrated in FIG. 16, the comparison shows that 1) the standard pinhole stereo model before considering projector lens distortion performed the worst; 2) the fractional model and the standard pinhole stereo model considering projector lens distortion overall performed the best comparing with the polynomial model without edging artifacts; 3) the polynomial model with a smaller effective FOV (without edging artifacts) achieved similar performance under certain scenarios; 4) the polynomial model with a large effective FOV (same as the fractional model) always performed worse than the fractional model. These experimental results demonstrate that if the projector intrinsic and extrinsic parameters as well as the nonlinear distortions can be directly obtained, such a model may be good choice. However, if the projector cannot be directly calibrated or the nonlinear distortions cannot be calibrated, the fractional pixel-wise model may be the preferred choice among these models.

Figure 17:
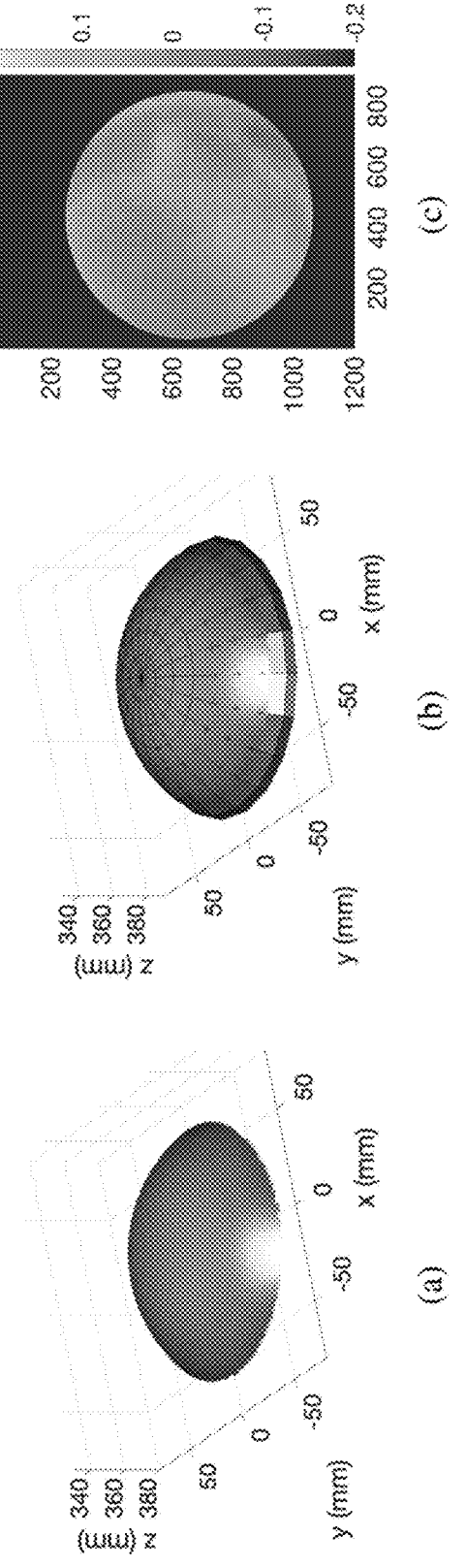
FIG. 17 shows an example of spherical surface measurement results obtained a structured light camera system calibrated in accordance with some aspects of the disclosed subject matter.

FIG. 17 shows an example of spherical surface measurement results obtained a structured light camera system calibrated in accordance with some aspects of the disclosed subject matter. FIG. 17, panel (a) shows a 3D reconstructed sphere; FIG. 17, panel (b) shows a fitted sphere overlay with measured sphere; FIG. 17, panel (c) shows a pixel-wise error map ($\sigma$=0.034 mm). A sphere with a radius of approximately 76 mm was also measured to further evaluate the performance of techniques described herein. FIG. 17 shows the measurement data from the pinhole model considering both projector and camera lens distortions. The data were then fit with an ideal sphere. For each point, the measurement error was calculated as the difference between the measured point to the fitted sphere center and the fitted radius. FIG. 17 shows the overlap between fitted sphere and the raw measured data, and the error map with $\sigma$=0.033 mm. Once again the measurement accuracy is relatively high.

Figure 18:
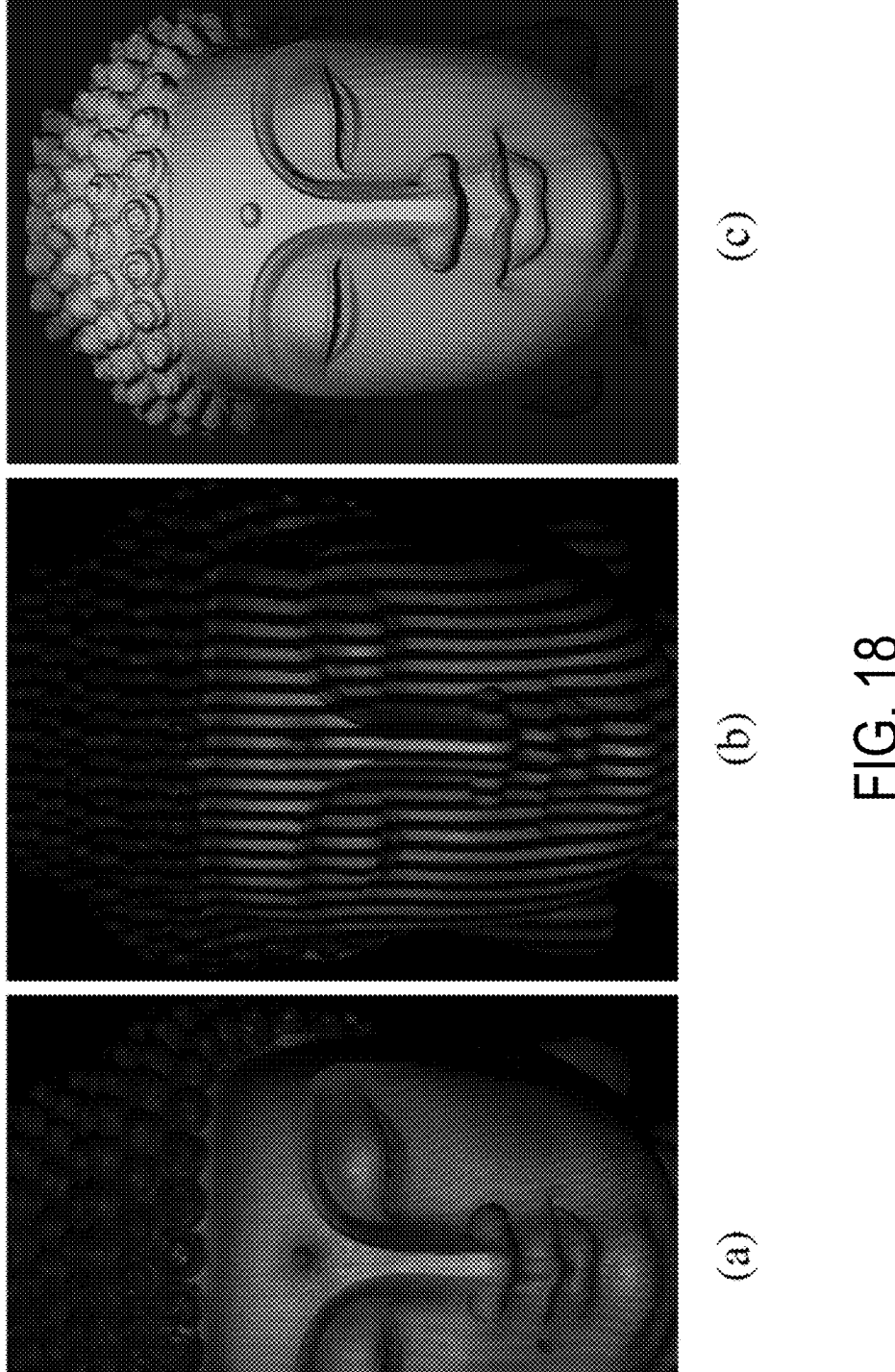
FIG. 18 shows an example of complex surface measurement results obtained a structured light camera system calibrated in accordance with some aspects of the disclosed subject matter.

FIG. 18 shows an example of complex surface measurement results obtained a structured light camera system calibrated in accordance with some aspects of the disclosed subject matter. FIG. 18, panel (a) shows a photograph of the object with the complex surface; FIG. 18, panel (b) shows one of the phase-shifted fringe patterns; and FIG. 18, panel (c) shows a 3D reconstruction of the object using depths determined from the calibrated structured light camera system. As shown in FIG. 18, a more complex surface was measured to visually demonstrate the success of techniques described herein. This experiment demonstrated that mechanisms described herein can reconstruct complex 3D shapes with fine details, as expected.

In some aspects, any suitable computer readable media can be used for storing instructions for performing the functions and/or processes described herein. For example, in some aspects, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, EPROM, EEPROM, etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof. It should be understood that the above-described steps of any processes described herein can be executed or performed in any order or sequence not limited to the order and sequence shown and described in the figures. Also, some of the above steps of the processes can be executed or performed substantially simultaneously where appropriate or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by any allowed claims that are entitled to priority to the subject matter disclosed herein. Features of the disclosed aspects can be combined and rearranged in various ways.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such aspects or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its aspects.

What is claimed is:

1. A method for calibrating a structured light camera system, comprising:
 receiving, from at least two cameras, a first plurality of images of a predetermined first pattern presented on a flat panel display;
 calibrating the at least two cameras using the first plurality of images and features of the predetermined first pattern;
 causing a light source to emit a series of second patterns toward a scene including a flat surface;
 receiving, from the at least two cameras, a second plurality of images of the series of second patterns projected on the flat surface; and
 calibrating the light source using the second plurality of images and features of the series of second patterns.

2. The method of claim 1, further comprising causing the flat panel display to present the predetermined first pattern.

3. The method of claim 1, wherein calibrating the at least two cameras comprises calculating nonlinear lens distortions for each of the at least two cameras.

4. The method of claim 1, wherein calibrating the light source using the second plurality of images and features of the series of second patterns comprises calculating nonlinear lens distortions for the light source.

5. The method of claim 1, wherein calibrating the light source using the second plurality of images and features of the series of second patterns comprises constructing an ideal 3D plane and computing horizontal and vertical phase maps of the flat surface with the series of second patterns projected thereon.

6. The method of claim 1, wherein respective ones of the first plurality of images correspond to the predetermined first pattern imaged from different positions.

7. The method of claim 1, wherein the series of second patterns include horizontal and vertical fringe patterns.

8. The method of claim 1, wherein the flat surface is a featureless surface.

9. A system for calibrating a structured light camera system, the system comprising:
 a light source;
 a first camera comprising:
  a first image sensor, and
  a first lens;
 a second camera comprising:
  a second image sensor, and
  a second lens; and
 at least one hardware processor that is programmed to:
  receive, from the first image sensor and the second image sensor, a first plurality of images of a predetermined first pattern presented on a flat panel display,
  calibrate the first camera and the second camera using the first plurality of images and features of the predetermined first pattern,
  cause the light source to emit a series of second patterns toward a scene including a flat surface,
  receive, from the first image sensor and the second image sensor, a second plurality of images of the series of second patterns projected on the flat surface, and
  calibrate the light source using the second plurality of images and features of the series of second patterns.

10. The system of claim 9, further comprising the flat panel display.

11. The system of claim 9, wherein the at least one hardware processor is further programmed to calculate nonlinear lens distortions for each of the first camera and the second camera.

12. The system of claim 9, wherein the at least one hardware processor is further programmed to calculate nonlinear lens distortions for the light source.

13. The system of claim 9, wherein the at least one hardware processor is configured to construct an ideal 3D plane and compute horizontal and vertical phase maps of the flat surface with the series of second patterns projected thereon.

14. The system of claim 9, wherein the flat surface is a featureless surface.

15. A non-transitory computer readable medium storing computer executable instructions that, when executed by a processor, cause the processor to perform operations comprising:
 receiving, from at least two cameras, a first plurality of images of a predetermined first pattern presented on a flat panel display;
 calibrating the at least two cameras using the first plurality of images and features of the predetermined first pattern;
 causing a light source to emit a series of second patterns toward a scene including a flat surface;
 receiving, from the at least two cameras, a second plurality of images of the series of second patterns projected on the flat surface; and calibrating the light source using the second plurality of images and features of the series of second patterns.

16. The non-transitory computer readable medium of claim 15, wherein the method further comprises causing the flat panel display to present the predetermined first pattern.

17. The non-transitory computer readable medium of claim 15, wherein calibrating the at least two cameras comprises calculating nonlinear lens distortions for each of the at least two cameras.

18. The non-transitory computer readable medium of claim 15, wherein calibrating the light source using the second plurality of images and features of the series of patterns comprises calculating nonlinear lens distortions for the light source.

19. The non-transitory computer readable medium of claim 15, wherein calibrating the light source using the second plurality of images and features of the series of second patterns comprises constructing an ideal 3D plane and computing horizontal and vertical phase maps of the flat surface with the series of second patterns projected thereon.

20. The non-transitory computer readable medium of claim 15, causing the light source to emit a series of second patterns toward the scene including the flat surface includes causing the light source to project sequentially project horizontal and vertical fringe patterns onto the flat surface.

* * * * *